US009614597B2

(12) United States Patent
Yi et al.

(10) Patent No.: US 9,614,597 B2
(45) Date of Patent: Apr. 4, 2017

(54) METHOD, DEVICE, AND SYSTEM FOR TRANSMITTING MU-MIMO PILOT AND DATA

(71) Applicant: Huawei Technologies Co., Ltd., Shenzhen (CN)

(72) Inventors: Xiongshu Yi, Shenzhen (CN); Jing Yang, Shenzhen (CN); Lu Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 14/585,765

(22) Filed: Dec. 30, 2014

(65) Prior Publication Data

US 2015/0171942 A1 Jun. 18, 2015

Related U.S. Application Data

(63) Continuation of application No. PCT/CN2013/076535, filed on May 31, 2013.

(30) Foreign Application Priority Data

Jul. 5, 2012 (CN) .......................... 2012 1 0230861

(51) Int. Cl.
*H04B 7/04* (2006.01)
*H04L 5/00* (2006.01)
(Continued)

(52) U.S. Cl.
CPC ......... *H04B 7/0452* (2013.01); *H04B 7/0413* (2013.01); *H04B 7/0697* (2013.01); *H04L 5/0048* (2013.01)

(58) Field of Classification Search
CPC . H04L 5/0023; H04L 5/0051; H04L 25/0226; H04L 25/03343; H04L 5/0048;
(Continued)

(56) References Cited

U.S. PATENT DOCUMENTS 8,238,483 B2 * 8/2012 Erell ..................... H04L 5/0023
375/141
2010/0322330 A1 12/2010 Jongren et al.
(Continued)

FOREIGN PATENT DOCUMENTS

CN 101378281 A 3/2009
CN 101743699 A 6/2010
(Continued)

OTHER PUBLICATIONS

Kaltenberger et al., "Relative Channel Reciprocity Calibration in MIMO/TDD Systems," Future Network and Mobile Summit 2010 Conference Proceedings, pp. 1-10, Institute of Electrical and Electronics Engineers, New York, New York (Jun. 16-18, 2010).
(Continued)

*Primary Examiner* — Hoang-Chuong Vu
(74) *Attorney, Agent, or Firm* — Leydig, Voit & Mayer, Ltd.

(57) ABSTRACT

Disclosed are a method, device and system for transmitting a Multi-user Multiple-Input-Multiple-Output (MU-MIMO) pilot and data. The method includes: when at least two terminals transmit a MU-MIMO pilot and data on one same time/frequency resource, constructing a k-stream SU-MIMO pilot and data; based on the configuration mode of the k-stream SU-MIMO pilot, modifying demodulation pilot port parameters of the at least two terminals; and based on the transmission mode of the k-stream SU-MIMO pilot and data, transmitting the k-stream SU-MIMO pilot and data to the at least two terminals, respectively. Further disclosed are a device and system for transmitting a MU-MIMO pilot and data.

20 Claims, 13 Drawing Sheets

(51) Int. Cl.
*H04B 7/0452* (2017.01)
*H04B 7/0413* (2017.01)
*H04B 7/06* (2006.01)

(58) Field of Classification Search
CPC ......... H04L 5/0091; H04L 2025/03426; H04L 5/005; H04B 7/0452; H04B 7/0413; H04B 7/0456; H04B 7/06; H04B 7/0697; H04B 7/08
See application file for complete search history.

(56) References Cited

U.S. PATENT DOCUMENTS

| | | | |
|---|---|---|---|
| 2011/0194504 A1 | 8/2011 | Gorokhov et al. | |
| 2012/0207119 A1* | 8/2012 | Zhang | H04L 5/0023 370/329 |
| 2012/0300728 A1 | 11/2012 | Lee et al. | |
| 2013/0010905 A1* | 1/2013 | Koike | H04L 27/0012 375/341 |
| 2013/0039348 A1* | 2/2013 | Hu | H04B 7/0613 370/335 |
| 2013/0194931 A1* | 8/2013 | Lee | H04L 5/0053 370/241 |
| 2013/0294369 A1* | 11/2013 | Dinan | H04L 5/001 370/329 |

FOREIGN PATENT DOCUMENTS

| | | |
|---|---|---|
| CN | 102484515 A | 5/2012 |
| WO | 2009023700 A2 | 2/2009 |
| WO | WO 2011085509 A1 | 7/2011 |
| WO | WO 2011090282 A2 | 7/2011 |

OTHER PUBLICATIONS

Huang et al., "Performance Analysis of Antenna Calibration in Coordinated Multi-Point Transmission System," Vehicular Technology Conference Spring 2010, pp. 1-5, Institute of Electrical and Electronics Engineers, New York, New York (May 16-19, 2010).
"3$^{rd}$ Generation Partnership Project; Technical Specification Group Radio Access Network; Evolved Universal Terrestrial Radio Access (E-UTRA); Physical Channels and Modulation(Release 10)," 3GPP TS 36.211, V10.5.0, pp. 1-101, 3$^{rd}$ Generation Partnership Project, Valbonne, France (Jun. 2012).
"DMRS considerations for MU MIMO," R1-101060, 3GPP TSG RAN WG1 Meeting #60, San Francisco, California, 3$^{rd}$ Generation Partnership Project, Valbonne, France (Feb. 22-26, 2010).

* cited by examiner

Antenna port 7                    Antenna port 8

Antenna port 9  Antenna port 10

METHOD, DEVICE, AND SYSTEM FOR TRANSMITTING MU-MIMO PILOT AND DATA

CROSS-REFERENCE TO RELATED APPLICATIONS

This application is a continuation of International Patent Application No. PCT/CN2013/076535, filed on May 31, 2013, which claims priority to Chinese Patent Application No. 201210230861.X, filed on Jul. 5, 2012, both of which are hereby incorporated by reference in their entireties.

FIELD

The invention relates to the field of communication technology, and particularly to a method, a device and a system for transmitting MU-MIMO pilot and data

BACKGROUND

With the rapid development of communication technology and the significant increase of terminals, technology of Multi-user Multiple-Input-Multiple-Output (MU-MIMO) has been widely applied. MU-MIMO is to improve average throughput of a system, and data of multiple downlink terminals is multiplexed on a same time and frequency resource to obtain Spatial Division Multiple Access (SDMA) gain. Since it is difficult for the terminals to realize detection unitedly, interference between the terminals becomes an important factor affecting the MU-MIMO performance. In order to conduct effective communicates with the terminals on a same time and frequency resource block, it is necessary to make MU-MIMO pilots independent or orthogonal from each other. A base station usually employs pre-coding technology to perform a pre-processing unitedly on data of the multiple terminals, to avoid the terminals to interfere with each other, and to facilitate the terminals to distinguish their signals accurately.

In the conventional technology, the pilot interference is reduced by a combination of a Scrambling identity (SCID) and a demodulation pilot port. Since a two-dimensional Walsh sequence (Walsh code) is used to distinguish, there are only two orthogonal demodulation pilot ports. In a case that the number of streams of MU-MIMO is greater than two, pseudo-orthogonal pilots occur due to the combination of SCID and the two-dimensional Walsh code.

In a case that a four-dimensional Walsh code is used to distinguish, four orthogonal demodulation pilot ports are obtained, which can solve the problem of the pseudo-orthogonal pilot in theory. Although the current Long Term Evolution (LTE) R10 protocol supports the four-dimensional Walsh code, MU-MIMO employs an agreement of the LTE R9 protocol which specifies that two streams of MU-MIMO employ the two-dimensional Walsh code to guarantee the orthogonality of the pilots and more than two streams of MU-MIMO employ a combination of the two-dimensional Walsh code and SCID to reduce pilot interference. However, in a case that the number of streams of MU-MIMO is greater than two, pseudo-orthogonal pilots occur due to the combination of SCID and the two-dimensional Walsh code.

In addition, the terminal cannot recognize the four-dimensional Walsh code for transparent MU-MIMO.

SUMMARY

The technical problem addressed by the embodiments of the invention is to provide a method, an apparatus and a system for MU-MIMO pilot and data transmission, in which k streams of Single-User Multiple-Input-Multiple-Output (SU-MIMO) pilot and data are constructed based on the total number k of streams of MU-MIMO pilot and data transmission performed by two terminals on a same time and frequency resource, and the k streams of SU-MIMO pilot and data are transmitted to the two terminals, therefore pseudo-orthogonality of the pilots is effectively avoided.

In order to solve the problem described above, an embodiment of the invention provides a method for transmitting MU-MIMO pilot and data, including:

constructing k streams of Single-User Multiple-Input-Multiple-Output (SU-MIMO) pilot and data in a case that at least two terminals perform transmission of Multi-User Multiple-Input-Multiple-Output (MU-MIMO) pilot and data on a same time and frequency resource;

modifying parameters of demodulation pilot ports of the at least two terminals in a configuration way of the k streams of the SU-MIMO pilot; and transmitting the k streams of the SU-MIMO pilot and data to the at least two terminals in a transmission way of the k streams of the SU-MIMO pilot and data, where the at least two terminals include a first terminal and a second terminal, the first terminal performs transmission of $L_1$ streams of the MU-MIMO pilot and data and the second terminal performs transmission of $L_2$ streams of the MU-MIMO pilot and data, where $$k = \sum_i L_i,$$

and $L_i$ is the number of streams of the MU-MIMO pilot and data transmission performed by an ith terminal.

Specifically, the $L_1$ streams of the MU-MIMO pilot and data of the first terminal correspond to $L_1$ weight values, and the $L_1$ streams of the MU-MIMO data of the first terminal correspond to p codewords; the $L_2$ streams of the MU-MIMO pilot and data of the second terminal correspond to $L_2$ weight values, and the $L_2$ streams of the MU-MIMO data of the second terminal correspond to q codewords;

the weight values are configured to be synthesized into a weight value matrix of SU-MIMO, and the codewords are configured to be synthesized into the SU-MIMIO data; and the step of constructing k streams of SU-MIMO pilot and data in a case that at least two terminals perform transmission of MU-MIMO pilot and data on a same time and frequency resource includes:

combining the $L_1$ weight values corresponding to the $L_1$ streams of the MU-MIMO pilot and data of the first terminal and the $L_2$ weight values corresponding to the $L_2$ streams of the MU-MIMO pilot and data of the second terminal in sequence, to obtain k weight values corresponding to the k streams of the SU-MIMO pilot and data;

taking any one of the p codewords corresponding to the $L_1$ streams of the MU-MIMO data of the first terminal as a first codeword of at least two codewords corresponding to the k streams of the SU-MIMO data, and taking any one of the q codewords corresponding to the $L_2$ streams of the MU-MIMO data of the second terminal as a second codeword of the at least two codewords corresponding to the k streams of the SU-MIMO data; and mapping the first codeword to the $L_1$ streams of the MU-MIMO data, and mapping the second codeword to the $L_2$ streams of the MU-MIMO data.

Specifically, the $L_1$ streams of the MU-MIMO pilot and data of the first terminal correspond to $L_1$ weight values, and the $L_1$ streams of the MU-MIMO data of the first terminal correspond to p codewords; the $L_2$ streams of the MU-MIMO pilot and data of the second terminal correspond to $L_2$ weight values, and the $L_2$ streams of the MU-MIMO data of the second terminal correspond to q codewords;

the weight values are configured to be synthesized into a weight value matrix of SU-MIMO, and the codewords are configured to be synthesized into the SU-MIMIO data; and the step of constructing k streams of SU-MIMO pilot and data in a case that at least two terminals perform transmission of MU-MIMO pilot and data on a same time and frequency resource includes:

combining the $L_1$ weight values corresponding to the $L_1$ streams of the MU-MIMO pilot and data of the first terminal and the $L_2$ weight values corresponding to the $L_2$ streams of the MU-MIMO pilot and data of the second terminal in sequence, to obtain k weight values corresponding to the k streams of the SU-MIMO pilot and data;

taking a combination of the p codewords corresponding to the $L_1$ streams of the MU-MIMO data of the first terminal as a first codeword of at least two codewords corresponding to the k streams of the SU-MIMO data, and taking a combination of the q codewords corresponding to the $L_2$ streams of the MU-MIMO data of the second terminal as a second codeword of the at least two codewords corresponding to the k streams of the SU-MIMO data; and mapping the first codeword to the $L_1$ streams of the MU-MIMO data, and mapping the second codeword to the $L_2$ streams of the MU-MIMO data.

Specifically, the step of modifying parameters of demodulation pilot ports of the at least two terminals in a configuration way of the k streams of the SU-MIMO pilot includes:

modifying the number of layers RI of the first terminal to be RI=k and notifying the first terminal of the modification, where the number of layers RI is the number of layers or streams of spatial multiplexing when the first terminal performs data transmission;

additionally setting $L_2$ virtual demodulation pilot ports for the first terminal, where the $L_2$ virtual demodulation pilot ports correspond to the $L_2$ streams of the MU-MIMO pilot of the second terminal; and configuring Scrambling identity (SCID) values of the demodulation pilot ports on the same time and frequency resource to be 0 or configuring SCID values of the demodulation pilot ports on the same time and frequency resource to be 1.

Specifically, the step of modifying parameters of demodulation pilot ports of the at least two terminals in a configuration way of the k streams of the SU-MIMO pilot includes:

modifying the number of layers RI' of the second terminal to be RI'=k and notifying the second terminal of the modification, where the number of layers RI' is the number of layers or streams of spatial multiplexing when the second terminal performs data transmission;

additionally setting $L_1$ virtual demodulation pilot ports for the second terminal, where the $L_1$ virtual demodulation pilot ports correspond to the $L_1$ streams of the MU-MIMO pilot and data of the first terminal; and configuring SCID values of the demodulation pilot ports on the same time and frequency resource to be 0 or configuring SCID values of the demodulation pilot ports on the same time and frequency resource to be 1.

Specifically, the step of transmitting the k streams of the SU-MIMO pilot and data to the at least two terminals in a transmission way of the k streams of the SU-MIMO pilot and data includes:

mapping a first codeword of at least two codewords corresponding to the k streams of the SU-MIMO data to a layer of the first terminal in the transmission way of the k streams of the SU-MIMO pilot and data; and mapping the layer of the first terminal to the demodulation pilot port in the transmission way of the k streams of the SU-MIMO pilot.

Specifically, the step of transmitting the k streams of the SU-MIMO pilot and data to the at least two terminals in a transmission way of the k streams of the SU-MIMO pilot and data includes:

mapping a second codeword of at least two codewords corresponding to the k streams of the SU-MIMO data to a layer of the second terminal in the transmission way of the k streams of the SU-MIMO pilot and data; and mapping the layer of the second terminal to the demodulation pilot port in the transmission way of the k streams of the SU-MIMO pilot.

Specifically, after the step of transmitting the k streams of the SU-MIMO pilot and data to the at least two terminals in a transmission way of the k streams of the SU-MIMO data, the method further includes:

determining, in a case that it is received a wrong check result fed back by the first terminal after the first terminal detects and decodes the codewords corresponding to the k streams of the SU-MIMO data, whether a codeword resulting in the wrong check result is an invalid codeword; and if the codeword resulting in the wrong check result is an invalid codeword, performing no retransmission; otherwise, retransmitting data corresponding to the codeword resulting in the wrong check result to the first terminal.

Specifically, after the step of transmitting the k streams of the SU-MIMO pilot and data to the at least two terminals in a transmission way of the k streams of the SU-MIMO data, the method further includes:

determining, in a case that it is received a wrong check result fed back by the second terminal after the second terminal detects and decodes the codewords corresponding to the k streams of the SU-MIMO data, whether a codeword resulting in the wrong check result is an invalid codeword; and if the codeword resulting in the wrong check result is an invalid codeword, performing no retransmission; otherwise, retransmitting data corresponding to the codeword resulting in the wrong check result to the second terminal.

Accordingly, an embodiment of the invention provides a method for receiving MU-MIMO pilot and data, including:

receiving k streams of SU-MIMO pilot and data constructed;

detecting energy of demodulation pilot ports corresponding to at least two codewords corresponding to the k streams of the SU-MIMO data;

comparing the energy of the demodulation pilot ports, to determine an invalid codeword; and feeding back a check result being 0 or 1 for the invalid codeword;

where the k streams of the SU-MIMO pilot and data are constructed based on $L_i$ streams of MU-MIMO pilot and data of at least two terminals for receiving MU-MIMO pilot and data, $$k = \sum_i L_i,$$

and $L_i$ is the number of streams of the MU-MIMO pilot and data transmission performed by an ith terminal; the MU-MIMO pilot and data transmission is nontransparent.

Accordingly, an embodiment of the invention provides an apparatus for transmitting MU-MIMO pilot and data, including a constructing module, a modifying module and a transmitting module, where the constructing module is configured to construct k streams of Single-User Multiple-Input-Multiple-Output (SU-MIMO) pilot and data in a case that at least two terminals perform transmission of Multi-User Multiple-Input-Multiple-Output (MU-MIMO) pilot and data on a same time and frequency resource;

the modifying module is configured to modify parameters of demodulation pilot ports of the at least two terminals in a configuration way of the k streams of the SU-MIMO pilot; and the transmitting module is configured to transmit the k streams of the SU-MIMO pilot and data to the at least two terminals in a transmission way of the k streams of the SU-MIMO pilot and data;

where the at least two terminals include a first terminal and a second terminal, the first terminal performs transmission of $L_1$ streams of the MU-MIMO pilot and data and the second terminal performs transmission of $L_2$ streams of the MU-MIMO pilot and data, where $$k = \sum_i L_i,$$

and $L_i$ is the number or streams of the MU-MIMO pilot and data transmission performed by an ith terminal.

Specifically, the $L_1$ streams of the MU-MIMO pilot and data of the first terminal correspond to $L_1$ weight values, and the $L_1$ streams of the MU-MIMO data of the first terminal correspond to p codewords; the $L_2$ streams of the MU-MIMO pilot and data of the second terminal correspond to $L_2$ weight values, and the $L_2$ streams of the MU-MIMO data of the second terminal correspond to q codewords;

the weight values are configured to be synthesized into a weight value matrix of SU-MIMO, and the codewords are configured to be synthesized into the SU-MIMIO data; and the constructing module includes:

a weight value synthesizing unit configured to combine the $L_1$ weight values corresponding to the $L_1$ streams of the MU-MIMO pilot and data of the first terminal and the $L_2$ weight values corresponding to the $L_2$ streams of the MU-MIMO pilot and data of the second terminal in sequence, to obtain k weight values corresponding to the k streams of the SU-MIMO pilot and data;

a codeword synthesizing unit configured to take any one of the p codewords corresponding to the $L_1$ streams of the MU-MIMO data of the first terminal as a first codeword of at least two codewords corresponding to the k streams of the SU-MIMO data, and take any one of the q codewords corresponding to the $L_2$ streams of the MU-MIMO data of the second terminal as a second codeword of the at least two codewords corresponding to the k streams of the SU-MIMO data; and a data mapping unit configured to map the first codeword to the $L_1$ streams of the MU-MIMO data, and map the second codeword to the $L_2$ streams of the MU-MIMO data.

Specifically, the codeword synthesizing unit is further configured to take a combination of the p codewords corresponding to the $L_1$ streams of the MU-MIMO data of the first terminal as a first codeword of at least two codewords corresponding to the k streams of the SU-MIMO data, and take a combination of the q codewords corresponding to the $L_2$ streams of the MU-MIMO data of the second terminal as a second codeword of the at least two codewords corresponding to the k streams of the SU-MIMO data.

Specifically, the modifying module includes:

a modifying unit configured to modify the number of layers RI of the first terminal to be RI=k and notifying the first terminal of the modification, where the number of layers RI is the number of layers or streams of spatial multiplexing when the first terminal performs data transmission;

a setting unit configured to additionally set $L_2$ virtual demodulation pilot ports for the first terminal, where the $L_2$ virtual demodulation pilot ports correspond to the $L_2$ streams of the MU-MIMO pilot of the second terminal; and a configuring unit configured to configure Scrambling identity (SCID) values of the demodulation pilot ports on the same time and frequency resource to be 0 or configure Scrambling identity SCID values of the demodulation pilot ports on the same time and frequency resource to be 1.

Specifically, the modifying unit is further configured to modify the number of layers RI' of the second terminal to be RI'=k and notifying the second terminal of the modification, where the number of layers RI' is the number of layers or streams of spatial multiplexing when the second terminal performs data transmission; and the setting unit is further configured to additionally set $L_1$ virtual demodulation pilot ports for the second terminal, where the $L_1$ virtual demodulation pilot ports correspond to the $L_1$ streams of the MU-MIMO pilot of the first terminal.

Specifically, the transmitting module includes:

a first mapping unit configured to map a first codeword of at least two codewords corresponding to the k streams of the SU-MIMO data to a layer of the first terminal in the transmission way of the k streams of the SU-MIMO pilot and data; and a second mapping unit configured to map the layer of the first terminal to the demodulation pilot port in the transmission way of the k streams of the SU-MIMO pilot.

Specifically, the first mapping unit is further configured to map a second codeword of at least two codewords corresponding to the k streams of the SU-MIMO data to a layer of the second terminal in the transmission way of the k streams of the SU-MIMO pilot and data; and the second mapping unit is further configured to map the layer of the second terminal to the demodulation pilot port in the transmission way of the k streams of the SU-MIMO pilot.

Specifically, the apparatus further includes:

a determining module configured to determine, in a case that it is received a wrong check result fed back by the first terminal after the first terminal detects and decodes the codewords corresponding to the k streams of the SU-MIMO data, whether a codeword resulting in the wrong check result is an invalid codeword; where the transmitting module is further configured to perform no retransmission if the codeword resulting in the wrong check result is an invalid codeword; and otherwise, retransmit data corresponding to the codeword resulting in the wrong check result to the first terminal.

Specifically, the determining module is further configured to determine, in a case that it is received a wrong check result fed back by the second terminal after the second terminal detects and decodes the codewords corresponding to the k streams of the SU-MIMO data, whether a codeword resulting in the wrong check result is an invalid codeword, and the transmitting module is further configured to perform no retransmission if the codeword resulting in the wrong check result is an invalid codeword; and otherwise, retransmit data corresponding to the codeword resulting in the wrong check result to the second terminal.

Accordingly, an embodiment of the invention provides a terminal for receiving MU-MIMO pilot and data, including a receiving module, a detecting module, a comparing module and a feedback module, where the receiving module is configured to receive k streams of SU-MIMO pilot and data constructed;

the detecting module is configured to detect energy of demodulation pilot ports corresponding to at least two codewords corresponding to the k streams of the SU-MIMO data;

the comparing module is configured to compare the energy of the demodulation pilot ports to determine an invalid codeword; and the feedback module is configured to feed back a check result being 0 or 1 for the invalid codeword;

where the k streams of the SU-MIMO pilot and data are constructed based on $L_1$ streams of MU-MIMO pilot and data of at least two terminals for receiving MU-MIMO pilot and data $$k = \sum_i L_i,$$

and $L_i$ is the number of streams of the MU-MIMO pilot and data transmission performed by an ith terminal; the MU-MIMO pilot and data transmission is nontransparent.

Accordingly, an embodiment of the invention provides a system for MU-MIMO pilot and data transmission, the system for MU-MIMO pilot and data transmission includes an apparatus for transmitting MU-MIMO pilot and data and at least two terminals for receiving MU-MIMO pilot and data which perform pilot and data transmission with the apparatus for transmitting MU-MIMO pilot and data, where the apparatus for transmitting MU-MIMO pilot and data includes the apparatus for transmitting MU-MIMO pilot and data according to the embodiment of the invention, and the terminal for receiving MU-MIMO pilot and data includes the terminal for receiving MU-MIMO pilot and data according to the embodiment of the invention.

The embodiments of the invention have the following advantageous.

In the embodiments of the invention, k streams of SU-MIMO pilot and data are constructed by determining the total number k of streams of MU-MIMO pilot and data transmission performed by at least two terminals on a same time and frequency resource, the parameters of demodulation pilot ports of the at least two terminals are modified accordingly, and the k streams of SU-MIMO pilot and data are transmitted to the terminals. Since the SU-MIMO pilot has good orthogonality and independency, pseudo-orthogonality of the pilots can be effectively avoided when at least two terminals perform MU-MIMO pilot and data transmission.

BRIEF DESCRIPTION OF THE DRAWINGS

In order to more clearly illustrate the technical solutions in the embodiments of the invention or the conventional technology, accompanying drawings for the description of the embodiments or the conventional technology are introduced below simply. Obviously, the accompanying drawings described below are just some embodiments of the invention. For those skilled in the art, other accompanying drawings may also be obtained based on the accompanying drawings without paying any creative work.

DETAILED DESCRIPTION

The technical solutions in the embodiments of the invention are described clearly and completely below in conjunction with drawing in the embodiments of the invention. Obviously, the described embodiments are just a few but not all of embodiments of the invention. Based on the embodiments of the invention, all other embodiments obtained by those skilled in the art without paying any creative work fall within the scope of protection of the invention.

Figure 1:
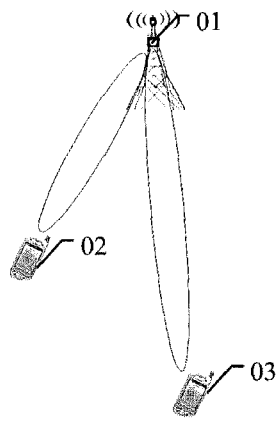
FIG. 1 is a schematic structural diagram of a system for MU-MIMO pilot and data transmission according to an embodiment of the invention.

Reference is made to FIG. 1 which is a schematic structural diagram of a system for MU-MIMO pilot and data transmission according to an embodiment of the invention. The system includes an apparatus 01 for transmitting MU-MIMO pilot and data, a first terminal 02 and a second terminal 03.

The apparatus 01 for transmitting MU-MIMO pilot and data may be provided in a base station, to perform pilot and data transmission with the first terminal 2 and the second terminal 03.

In a case that at least two terminals on a same time and frequency resource, for example, the first terminal 02 and the second terminal 03 in the embodiment, perform Multi-user Multiple-Input-Multiple-Output (MU-MIMO) pilot and data transmission which is transparent herein, the apparatus 01 for transmitting MU-MIMO pilot and data constructs k streams of Single-user Multiple-Input-Multiple-Output (SU-MIMO) pilot and data, and modifies parameters of demodulation pilot ports and the number of layers (RI, also referred to as RANK, which is the number of layers or the number of streams of spatial multiplexing informed by a base station and employed by the terminal when the terminal performs data transmission) of the two terminals in a configuration way of the k streams of SU-MIMO pilot, and transmits the k streams of SU-MIMO pilot and data to the first terminal 02 and the second terminal 03 in a transmission way of the k streams of SU-MIMO pilot and data.

In a case that the MU-MIMO pilot and data transmission is non-transparent, a terminal for receiving MU-MIMO pilot and data included in the terminal which performs MU-MIMO pilot and data transmission with the apparatus 01 for transmitting MU-MIMO pilot and data is illustrated in detail below in an embodiment.

Figure 2:
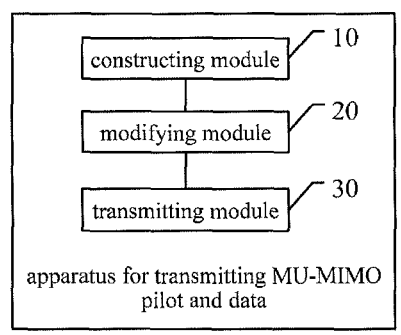
FIG. 2 is a schematic structural diagram of a first embodiment of an apparatus for transmitting MU-MIMO pilot and data shown in FIG. 1 according to the invention.

Reference is made to FIG. 2 which is a schematic structural diagram of a first embodiment of the apparatus 01 for transmitting MU-MIMO pilot and data shown in FIG. 1. The apparatus 01 for transmitting MU-MIMO pilot and data includes a constructing module 10, a modifying module 20 and a transmitting module 30.

The constructing module 10 is configured to construct k streams of Single-user Multiple-Input-Multiple-Output (SU-MIMO) pilot and data when at least two terminals perform Multiple-user Multiple-Input-Multiple-Output (MU-MIMO) pilot and data transmission on a same time and frequency resource.

The at least two terminals include a first terminal and a second terminal, the first terminal performs transmission of $L_1$ streams of MU-MIMO pilot and data, and the second terminal performs transmission of $L_2$ streams of MU-MIMO pilot and data, where $$k = \sum_i L_i,$$

and $L_i$ is the number of streams of MU-MIMO pilot and data transmission performed by an ith terminal.

The $L_1$ streams of MU-MIMO pilot and data of the first terminal correspond to $L_1$ weight values, and the $L_1$ streams of MU-MIMO data of the first terminal correspond to p codewords. The $L_2$ streams of MU-MIMO pilot and data of the second terminal correspond to $L_2$ weight values, and the $L_2$ streams of MU-MIMO data of the second terminal correspond to q codewords.

The weight values are used to be synthesized into a weight value matrix of SU-MIMO, and the codewords are used to be synthesized into SU-MIMO data.

The codeword is a bit stream of a service stream from an upper layer after channel coding. The number of bits and the code rate of the channel coding may be different for different codewords.

In LTE R10, p=1 if $L_1$=1, and p=2 if $L_1 \geq 2$, that is, in a case that the first terminal performs a single stream of MU-MIMO data transmission, the single stream of MU-MIMO data transmission corresponds to one codeword, and in a case that the first terminal performs more than two streams of MU-MIMO data transmission, the more than two streams of MU-MIMO data transmission correspond to two codewords, i.e., the MU-MIMO data transmission corresponds to at most two codewords, no matter how many streams of MU-MIMO data transmission are performed by the first terminal. Similarly, q=1 if $L_2$=1, and q=2 if $L_2 \geq 2$, that is, the MU-MIMO data transmission corresponds to at most two codewords, no matter how many streams of MU-MIMO data transmission are performed by the second terminal.

In other protocol, the multiple streams of MU-MIMO data transmission performed by the terminal may correspond to more than two codewords, and in this case, the codewords may be synthesized with reference to the concept of the embodiment of the invention, to achieve pilot and data transmission.

In the embodiment of the invention, the first terminal performs a single stream of MU-MIMO pilot and data transmission, that is, $L_1$=1, and the second terminal performs two streams of MU-MIMO pilot and data transmission, that is, $L_2$=2, for example.

Reference is made to Table 1:

TABLE 1

| Number of layers | Number of codewords | Codeword-to-layer mapping $i = 0, 1, \ldots, M_{symb}^{layer} - 1$ | |
|---|---|---|---|
| 3 | 2 | $x^{(0)}(i) = d^{(0)}(i)$<br>$x^{(1)}(i) = d^{(1)}(2i)$<br>$x^{(2)}(i) = d^{(1)}(2i + 1)$ | $M_{symb}^{layer} = M_{symb}^{(0)} = M_{symb}^{(1)}/2$ |

It can be seen from Table 1 that, for a terminal that performs three streams of Single-User Multiple-Input-Multiple-Output (SU-MIMO) pilot and data transmission, the three streams of data correspond to two codewords, with the first codeword being mapped to the first layer (that is, the first stream of data) and with the second codeword being mapped to the second layer and the third layer (that is, the second stream of data and the third stream of data). Similarly, for two terminals that perform totally three streams of MU-MIMO pilot and data transmission, for example, the first terminal performs a single stream of MU-MIMO pilot and data transmission and the second terminal performs two streams of MU-MIMO pilot and data transmission in the embodiment of the invention, a design for pilot orthogonality may be conducted by virtual RI with reference to the mapping rule between the codeword and the number of layers shown in Table 1, that is, the MU-MIMO pilot and data of the first terminal and the second terminal are combined on the same time and frequency resource to obtain SU-MIMO pilot and data, and the SU-MIMO pilot and data is transmitted to both the first terminal and the second terminal in a SU-MIMO way. Since the transmission way of SU-MIMO pilot and data has a good orthogonality and independency, pseudo-orthogonality of the pilots when the first terminal and the second terminal perform the MU-MIMO pilot and data transmission is avoided.

In a case that on a same time and frequency resource, the first terminal performs a single stream of MU-MIMO pilot and data transmission, that is, $L_1$=1, and the second terminal performs two streams of MU-MIMO pilot and data transmission, that is, $L_2=2$, the constructing module 10 constructs k streams of SU-MIMO pilot and data, where $$k = \sum_i L_i = L_1 + L_2 = 3,$$

the first stream of the three streams of SU-MIMO pilot and data is the single stream of MU-MIMO pilot and data of the first terminal, and the second stream and the third stream are the two streams of MU-MIMO pilot and data of the second terminal.

Since the terminal detects the data and feeds back Acknowledgment/Negative-Acknowledgment (ACK/NACK) according to the codeword, the first terminal that performs the single stream of MU-MIMO data transmission is to occupy one codeword, and the second terminal that performs the two streams of MU-MIMO data transmission is to occupy two codewords. One codeword of the two codewords corresponding to the second terminal may be selected and then combined with the codeword of the first terminal to obtain two codewords to be used for the SU-MIMO transmission, and the mapping between the codewords and the layers is achieved by using a transmission way of SU-MIMO pilot and data of a single terminal with RI=3, with the first codeword corresponding to the single stream of MU-MIMO data of the first terminal and with the second codeword corresponding to the two streams of MU-MIMO data of the second terminal. In this case, the other codeword of the second terminal that is not mapped may be processed in a next sub-frame in a similar way. Alternatively, the mapping of the other codeword of the second terminal may be completed in a retransmission way of the other codeword of a single terminal.

If there is idle resource, operations such as codeword cascade and codeword interception may be performed on the two codewords of the second terminal, to obtain a combination of the two codewords which is taken as the second codeword of the three streams of SU-MIMO data, therefore, all codewords can be transmitted by one transmission.

The modifying module 20 is configured to modify parameters of demodulation pilot ports of the at least two terminals in a configuration way of the k streams of SU-MIMO pilot.

The parameters of demodulation pilot ports include the number of layers RI, the number of demodulation pilot ports and a SCID value.

The actual number of layers RI of the first terminal equals to 1 (the actual number of codewords is also 1, and one codeword is mapped to one layer), the modifying module 20 modifies RI of the first terminal to be 3, and informs the first terminal of RI=3 by Downlink Control Information (DCI).

In this case, the number of streams of the data of the first terminal is virtualized from one to three, therefore, three corresponding demodulation pilot ports (Port) are required. Compared with the original configuration of one stream, the modifying module 20 additionally sets two virtual demodulation pilot ports for the first terminal which correspond to the two streams of MU-MIMO pilot and data of the second terminal.

Similarly, the modifying module 20 modifies RI' of the second terminal to be 3, and informs the second terminal of RI'=3 by DCI. Accordingly, the modifying module 20 additionally sets one demodulation pilot port for the second terminal which corresponds to the single stream of MU-MIMO pilot and data of the first terminal, the details thereof is not described herein.

The modifying module 20 configures a demodulation pilot port for the first stream of the first terminal to be Port7&(SCID=0 or 1), configures a demodulation pilot port for the second stream of the second terminal to be Port8& (with its SCID value being the same as the SCID value of the demodulation pilot port Port7 of the first terminal), and configures a demodulation pilot port for the third stream of the second terminal to be Port9&(SCID=0 or 1).

Figure 3A:
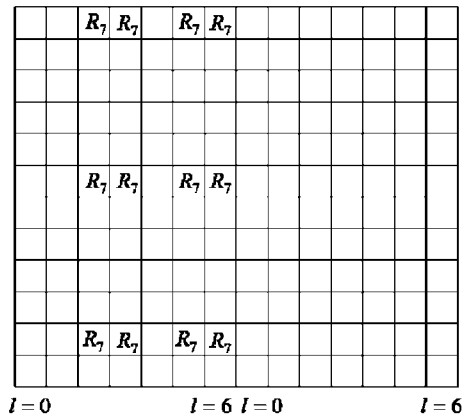
FIGS. 3A and 3B are schematic diagrams of pilot patterns of coordinated multiple points (Demodulation Reference Pilot, DRS) in the LTE R10 protocol.
Figure 3A:
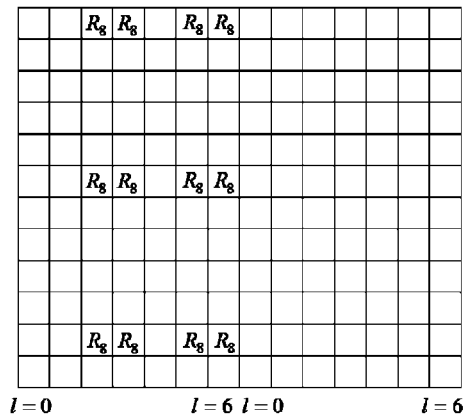
Figure 3A:
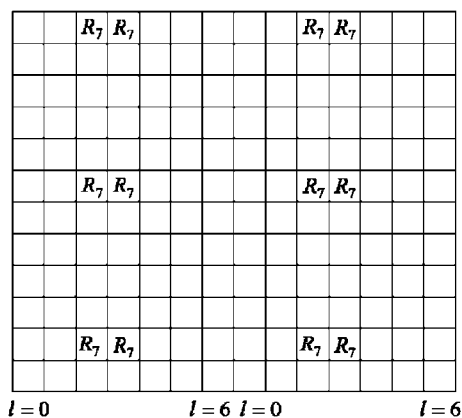
Figure 3A:
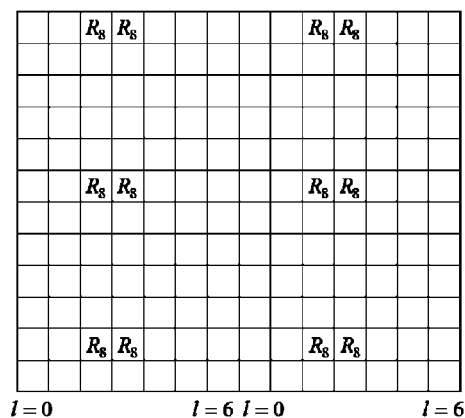
Figure 3A:
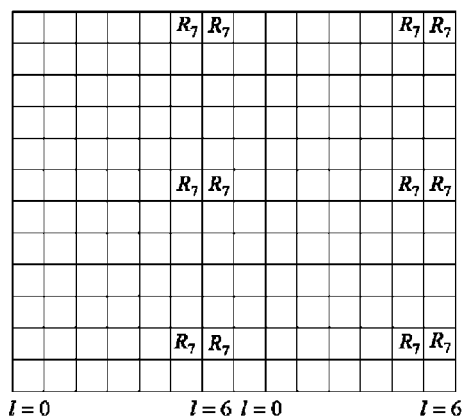
Figure 3A:
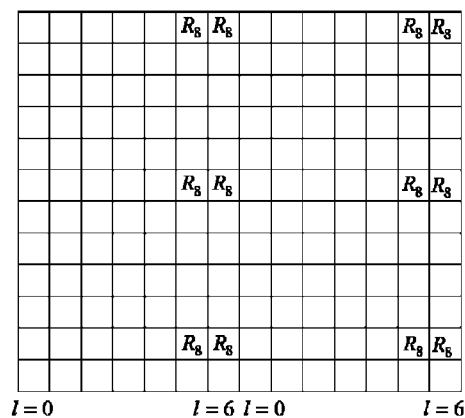
Figure 3B:
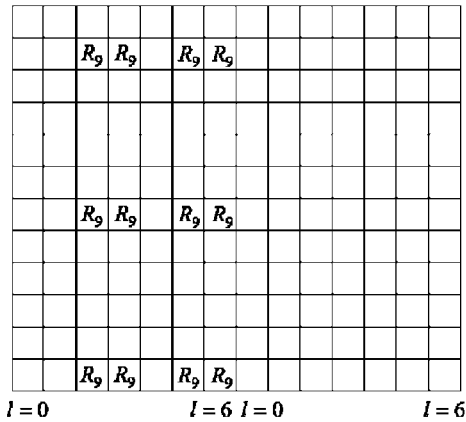
Figure 3B:
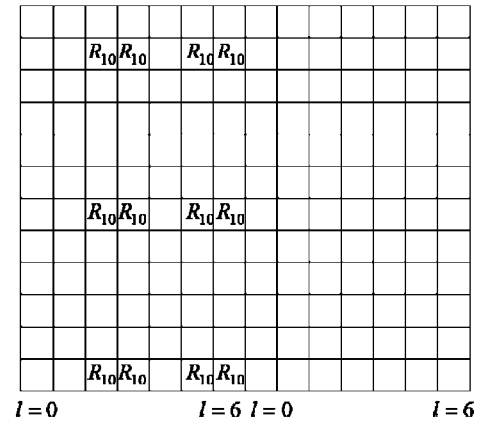
Figure 3B:
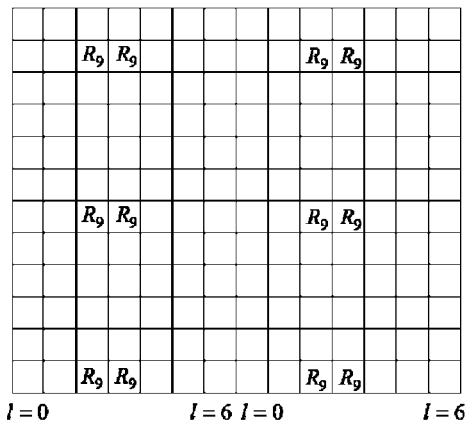
Figure 3B:
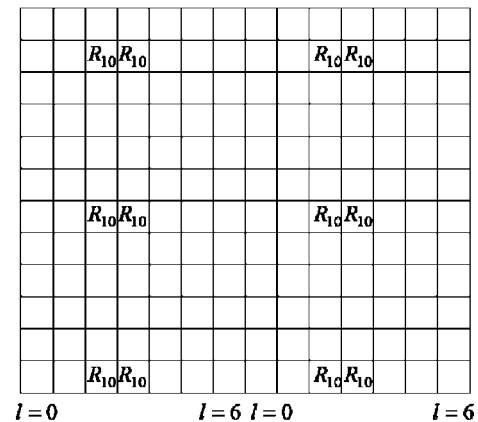
Figure 3B:
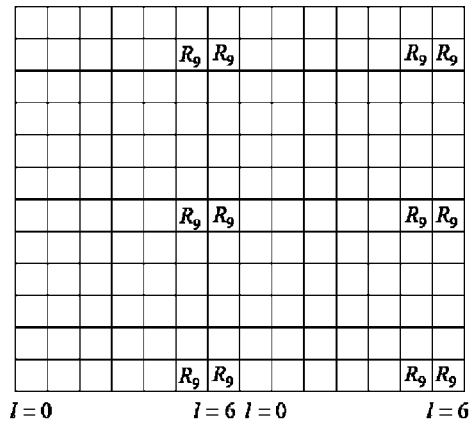
Figure 3B:
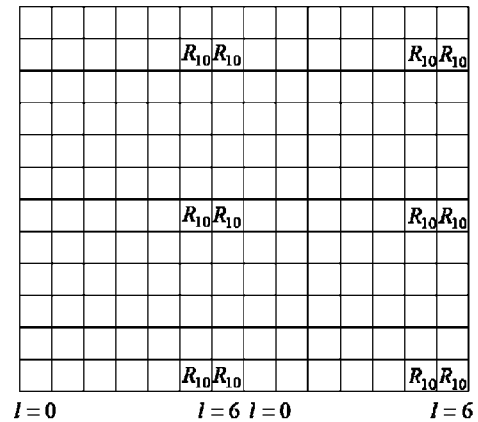

Reference is made to FIGS. 3A and 3B which are schematic diagrams of DRS pilot patterns in the LTE R10 protocol. It can be seen from FIGS. 3A and 3B that the demodulation pilot ports Port7 and Port8 are on a same time and frequency resource and are distinguished by using a two-dimensional Walsh code, while the demodulation pilot ports Port9 and Port10 are also on a same time and frequency resource and are distinguished by using a two-dimensional Walsh code. Therefore, independency and orthogonality of the pilots can be achieved and thus pseudo-orthogonality of the pilots can be avoided, as long as SCID values of the two demodulation pilot ports on the same time and frequency resource equal to each other. That is, independency and orthogonality of the pilots between the first terminal and the second terminal can be ensured, as long as the SCID value of the demodulation pilot port Port7 for the first stream of the first terminal is the same as the SCID value of the demodulation pilot port Port8 for the second stream of the second terminal.

Figure 4:
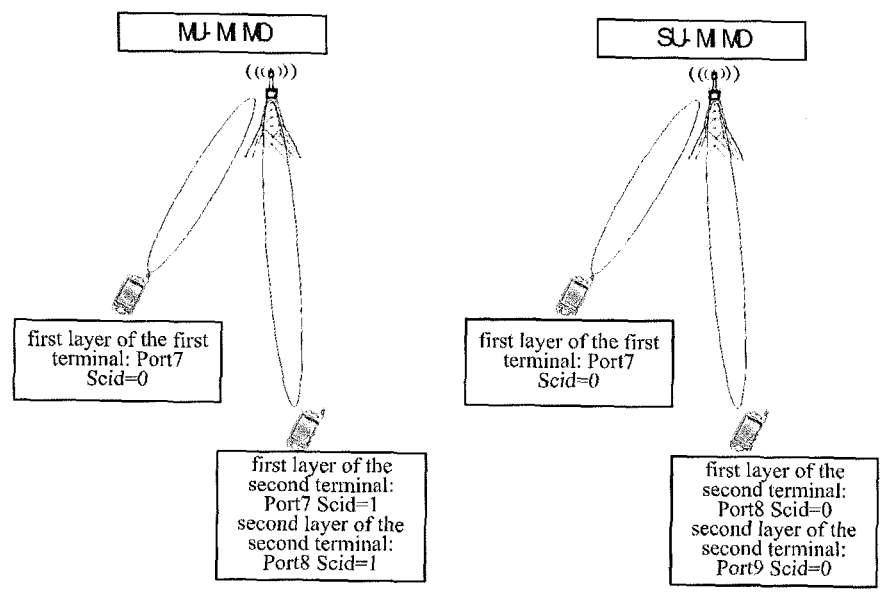
FIG. 4 is a schematic diagram of scenarios of pilot and data transmission.

Reference is made to FIG. 4 which is a schematic diagram of scenarios of pilot and data transmission. The left side of FIG. 4 illustrates a schematic diagram of a scenario of pilot and data transmission according to the conventional technology, it can be seen that in a case that the number of streams of the pilot and data is more than 2, the SCID values of the demodulation pilot ports on a same time and frequency resource are different from each other due to the configuration of the parameters of the demodulation pilot ports of the terminal, therefore, the pseudo-orthogonality of the pilots is inevitable. The right side of FIG. 4 illustrates a schematic diagram of a scenario of pilot and data transmission according to the embodiment of the invention, it can be seen that in a case that the number of streams of the pilot and data is more than 2, the SCID values of the demodulation pilot ports on a same time and frequency resource are the same due to the configuration of the parameters of the demodulation pilot ports of the terminal, therefore, the orthogonality of the pilots is ensured.

The transmitting module 30 is configured to transmit the k streams of SU-MIMO pilot and data to both the two terminals in a transmission way of the k streams of SU-MIMO pilot and data.

Specifically, the transmitting module 30 transmits the three streams of SU-MIMO pilot and data constructed by the constructing module 10 to the first terminal and the second terminal.

The first terminal can demodulate only the first stream of pilot and data (that is, the MU-MIMO pilot and data of the first terminal) in the three streams of SU-MIMO pilot and data, but cannot demodulate the second stream of pilot and data and the third stream of pilot and data in the three streams of SU-MIMO pilot and data, therefore, the second stream of pilot and data and the third stream of pilot and data in the three streams of SU-MIMO pilot and data are virtual and insignificant for the first terminal.

Similarly, the second terminal can demodulate only the second stream of pilot and data and the third stream of pilot and data (that is, the MU-MIMO pilot and data of the second terminal) in the three streams of SU-MIMO pilot and data, but cannot demodulate the first stream of pilot and data in the three streams of SU-MIMO pilot and data.

In the embodiment of the invention, k streams of SU-MIMO pilot and data are constructed by determining the total number k of streams of MU-MIMO pilot and data transmission performed by at least two terminals on a same time and frequency resource, parameters of demodulation pilot ports of the at least two terminal are modifies accordingly, and the k streams of SU-MIMO pilot and data are transmitted to the terminals. Since the SU-MIMO pilot has good orthogonality and independency, pseudo-orthogonality of the pilots when the two terminals perform the MU-MIMO pilot and data transmission can be effectively avoided in the embodiment of the invention.

Figure 5:
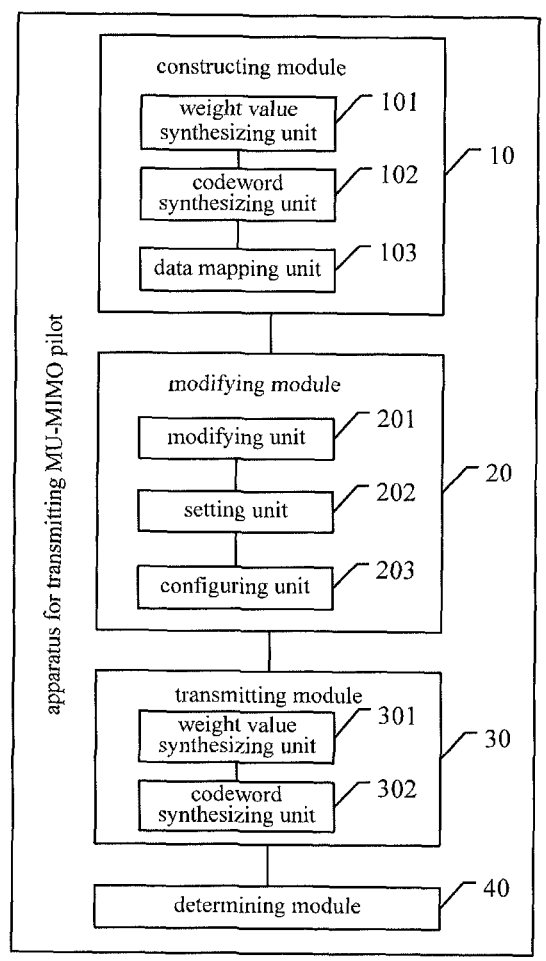
FIG. 5 is a schematic structural diagram of a second embodiment of an apparatus for transmitting MU-MIMO pilot and data according to the invention.

Further, reference is made to FIG. 5 which is a schematic structural diagram of a second embodiment of the apparatus for transmitting MU-MIMO pilot and data according to the invention. The apparatus for transmitting MU-MIMO pilot and data includes the constructing module 10, the modifying module 20 and the transmitting module 30 in the embodiment described above, and the apparatus for transmitting pilot and data further includes a determining module 40 in the embodiment.

The constructing module 10 includes a weight value synthesizing unit 101, a codeword synthesizing unit 102 and a data mapping unit 103.

The weight value synthesizing unit 101 is configured to combine $L_1$ weight values of the $L_1$ streams of MU-MIMO pilot and data of the first terminal and $L_2$ weight values of the $L_2$ streams of MU-MIMO pilot and data of the second terminal in sequence, to obtain k weight values of the k streams of SU-MIMO pilot and data.

The weight value of the single stream of MU-MIMO pilot and data of the first terminal is:

$$W_{usr0} = \begin{bmatrix} w_{00}^{usr0} \\ w_{10}^{usr0} \\ \vdots \\ w_{(N-1)0}^{usr0} \end{bmatrix} = [w_0^{usr0}]$$

The two weight values of the two streams of MU-MIMO pilot and data of the second terminal are:

$$W_{usr1} = \begin{bmatrix} w_{00}^{usr1} & w_{01}^{usr1} \\ w_{10}^{usr1} & w_{11}^{usr1} \\ \vdots & \vdots \\ w_{(N-1)0}^{usr1} & w_{(N-1)1}^{usr1} \end{bmatrix} = [w_0^{usr1} \ w_1^{usr1}]$$

Similarly, a weight value matrix of a single terminal performing three streams of SU-MIMO pilot and data transmission with the number of layers being RI=3 is:

$$W = [w_0 \ w_1 \ w_2]$$

The weight value synthesizing unit 101 combines one weight value of the single stream of MU-MIMO pilot and data of the first terminal and two weight values of the two streams of MU-MIMO pilot and data of the second terminal in sequence, to obtain three weight values of the three streams of SU-MIMO pilot and data as follows:

$$W = [w_0^{usr0} \ w_0^{usr1} \ w_1^{usr1}]$$

It is to be noted that, the LTE R10 protocol specifies that the demodulation pilot port of the first stream of three streams of SU-MIMO must be mapped to Port7, therefore, the first weight value of the three weight values of the three streams of SU-MIMO pilot and data should correspond to Port7, that is, the first weight value should be at the first position among the three weight values.

Reference is made to Table 2:

TABLE 2

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In Table 2, the first column represents a correspondence among the number of streams of SU-MIMO, the demodulation pilot port and the SCID in a case that there is only one codeword, and the second column represents a correspondence among the number of streams of SU-MIMO, the demodulation pilot port and the SCID in a case that there are two codewords. It can be seen that in a case that the number of streams is 3, the demodulation pilot port of the first stream must be mapped to Port7.

Accordingly, the transmitting module 30 transmits the following three streams of SU-MIMO data constructed by the constructing module 10 to the first terminal and the second terminal:

$$s_{DataTx} = [w_0^{usr0} \ w_0^{usr1} \ w_1^{usr1}] \cdot s$$

$$= [w_0^{usr0} \ w_0^{usr1} \ w_1^{usr1}] \cdot \begin{bmatrix} s_{usr0,0} \\ s_{usr1,0} \\ s_{usr1,1} \end{bmatrix}$$

$$= w_0^{usr0} s_{usr0,0} + w_0^{usr1} s_{usr1,0} + w_1^{usr1} s_{usr1,1}$$

The codeword synthesizing unit 102 is configured to take any one of the p codewords of the $L_1$ streams of MU-MIMO data of the first terminal as the first codeword of at least two codewords of the k streams of SU-MIMO data, and take any one of the q codewords of the $L_2$ streams of MU-MIMO data of the second terminal as the second codeword of the at least two codewords of the k streams of SU-MIMO data.

Reference is made to Table 3:

TABLE 3

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = M_{symb}^{(0)}/3$ |

TABLE 3-continued

| Number of layers | Number of codewords | Codeword-to-layer mapping $i = 0, 1, \ldots, M_{symb}^{layer} - 1$ | |
|---|---|---|---|
| 3 | 2 | $x^{(0)}(i) = d^{(0)}(i)$ $x^{(1)}(i) = d^{(1)}(2i)$ $x^{(2)}(i) = d^{(1)}(2i + 1)$ | $M_{symb}^{layer} = M_{symb}^{(0)} = M_{symb}^{(1)}/2$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = M_{symb}^{(0)}/4$ |
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M_{symb}^{layer} = M_{symb}^{(0)}/2 = M_{symb}^{(1)}/2$ |
| 5 | 2 | $x^{(0)}(i) = d^{(0)}(2i)$ $x^{(1)}(i) = d^{(0)}(2i + 1)$ $x^{(2)}(i) = d^{(1)}(3i)$ $x^{(3)}(i) = d^{(1)}(3i + 1)$ $x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(3i)$ $x^{(4)}(i) = d^{(1)}(3i + 1)$ $x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(4i)$ $x^{(4)}(i) = d^{(1)}(4i + 1)$ $x^{(5)}(i) = d^{(1)}(4i + 2)$ $x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ $x^{(4)}(i) = d^{(1)}(4i)$ $x^{(5)}(i) = d^{(1)}(4i + 1)$ $x^{(6)}(i) = d^{(1)}(4i + 2)$ $x^{(7)}(i) = d^{(1)}(4i + 3)$ | $M_{symb}^{layer} = M_{symb}^{(0)}/4 = M_{symb}^{(1)}/4$ |

It can be seen from Table 3 that, the LTE R10 protocol specifies that the maximum number of codewords of a single terminal is 2, and in the embodiment of the invention, the first terminal that performs the single stream of MU-MIMO pilot and data transmission occupies one codeword, and the second terminal that performs the two streams of MU-MIMO pilot and data transmission occupies two codewords, therefore, there are totally three codewords; the SU-MIMO with RI=3 is employed for transmission and three codewords are required to be mapped to two codewords.

The codeword synthesizing unit 102 takes one codeword of the single stream of MU-MIMO data of the first terminal as the first codeword of the three streams of SU-MIMO data, and takes any one of two codewords of the two streams of MU-MIMO data of the second terminal as the second codeword of the three streams of SU-MIMO data.

In this case, the other codeword of the second terminal that is not used may be processed in a next sub-frame in a similar way. Alternatively, the mapping of the other codeword of the second terminal may be completed in a retransmission way of the other codeword of a single terminal.

It is to be noted that, in a case that the number of streams of the MU-MIMO pilot and data of one of the two terminals is less, it is preferable to take any one or a combination of codewords of the terminal with the less number of streams of MU-MIMO pilot and data as the first codeword of the k streams of SU-MIMO pilot and data.

The codeword synthesizing unit 102 may further perform operations such as codeword cascade and codeword interception on the two codewords of the two streams of MU-MIMO data of the second terminal, to obtain a combination of the two codewords as the second codeword of at least two codewords of the k streams of SU-MIMO data.

The data mapping unit 103 is configured to map the first codeword to the $L_1$ streams of MU-MIMO data of the first terminal, and map the second codeword to the $L_2$ streams of MU-MIMO data of the second terminal.

Specifically, the data mapping unit 103 maps the first codeword of the three streams of SU-MIMO pilot and data to the single stream of MU-MIMO data of the first terminal, and maps the second codeword of the three streams of SU-MIMO pilot and data to the two streams of MU-MIMO data of the second terminal.

In this case, there is still one codeword for the second terminal that is not mapped, and the one codeword that is not mapped is processed in a next sub-frame in a similar way. Alternatively, the mapping of the codeword that is not mapped may be completed in a retransmission way of the codeword of a single terminal.

The modifying module 20 includes a modifying unit 201, a setting unit 202 and a configuring unit 203.

The modifying unit 201 is configured to modify the number of layers RI of the first terminal to be RI=k and notify the first terminal of the modification, where the number of layers RI is the number of layers or streams of spatial multiplexing when the first terminal performs data transmission.

The number of layers RI corresponds to the number of streams of the pilot and data transmission performed by the first terminal. In a case that the first terminal performs one stream of MU-MIMO pilot and data transmission, the number of layers RI thereof equals to 1. In a case that the apparatus for transmitting MU-MIMO pilot and data is to transmit three streams of SU-MIMO pilot and data to the first terminal, the modifying unit 201 modifies the number of layers RI of the first terminal to be RI=3, and inform the first terminal of RI=3 through DCI.

The setting unit 202 is configured to additionally set $L_2$ demodulation pilot ports for the first terminal, which correspond to the $L_2$ streams of MU-MIMO pilot of the second terminal.

In this case, the number of streams of the pilot and data transmission of the first terminal is increased from one to three, therefore, three corresponding demodulation pilot ports are required. Compared with the configuration of one stream of MU-MIMO pilot and data, the setting unit 202 additionally sets two demodulation pilot ports for the first terminal, that is, the demodulation pilot ports of the first terminal are Port7, Port8 and Port9, where Port7 and Port8 are on a same time and frequency resource.

The configuring unit 203 is configured to configure all of Scrambling identity (SCID) values of the demodulation pilot ports on the same time and frequency resource to be 0 or configure all of Scrambling identity (SCID) values of the demodulation pilot ports on the same time and frequency resource to be 1.

Specifically, the configuring unit 203 configures all of the SCID values of the demodulation pilot ports Port7 and Port8 on the same time and frequency resource to be 0 or to be 1.

Preferably, the first codeword of the three streams of SU-MIMO data is mapped to the single stream of MU-MIMO data of the first terminal, that is, the first codeword of the three streams of SU-MIMO data corresponds to the demodulation pilot port Port7 of the first terminal, the first terminal can demodulate only one stream of data corresponding to the first codeword of the three streams of SU-MIMO data, therefore, the configuring unit 203 configures the demodulation pilot port for the first stream of the first terminal to be Port7&(SCID=0 or 1), but does not configure the demodulation pilot ports for the second stream and the third stream of the first terminal, which are reserved for the second terminal for pilot transmission.

In the embodiment of the invention, the first terminal only uses Port7, and the second terminal uses Port8 and Port9, with Port7 and Port8 being on a same time and frequency resource, therefore, the configuring unit 203 configures the SCID value of the demodulation pilot port Port8 of the second terminal to be the same as the SCID value of the demodulation pilot port Port7 of the first terminal. The configuring unit 203 may configure the SCID value of the demodulation pilot port Port9 of the second terminal to 0 or 1 arbitrarily.

The transmitting module 30 includes a first mapping unit 301 and a second mapping unit 302.

The first mapping unit 301 is configured to map the first codeword of at least two codewords of the k streams of SU-MIMO data to a layer of the first terminal in a transmission way of the k streams of SU-MIMO pilot and data.

Specifically, the first mapping unit 301 maps the first codeword of the three streams of SU-MIMO data to the first layer of the first terminal in the transmission way of the k streams of SU-MIMO pilot and data.

The second mapping unit 302 is configured to map the layer of the first terminal to a demodulation pilot port in the transmission way of the k streams of SU-MIMO pilot.

Specifically, the second mapping unit 302 maps the first layer of the first terminal to a demodulation pilot port Port7 of the first terminal in the transmission way of the k streams of SU-MIMO pilot.

The determining module 40 is configured to determine, in a case that it is received a wrong check result fed back by the first terminal after the first terminal detects and decodes the codewords of the k streams of SU-MIMO data, whether a codeword resulting in the wrong check result is an invalid codeword.

After the transmitting module 30 transmits the three streams of SU-MIMO pilot and data constructed by the constructing module 10 to the first terminal, the first terminal demodulates the three streams of SU-MIMO pilot and data in a demodulation way of three streams of SU-MIMO pilot and data. Specifically, the first terminal detects and decodes the two codewords of the three streams of SU-MIMO data, and feeds back a check result of Cyclic Redundancy Check (CRC), including ACK/NACK.

In a case that the determining module 40 receives a wrong (NACK) check result fed back by the first terminal after the first terminal detects the two codewords of the three streams of SU-MIMO data, the determining module 40 determines whether the codeword resulting in the wrong check result is an invalid codeword.

In a case that the codeword resulting in the wrong check result is an invalid codeword, i.e., the second codeword, it is determined that the second stream and the third stream of the three streams of SU-MIMO data are wrong. Since the first stream is the MU-MIMO data of the first terminal, the first terminal only concerns the first stream of the three streams of SU-MIMO data, and the wrong second stream or third stream does not affect the first terminal, so data retransmission is not needed.

Since the base station knows which codeword of the first terminal is an invalid codeword, the base station directly disregards the fed check result. If the wrong check result is due to a desired codeword, data retransmission is performed.

The transmitting module 30 is further configured to retransmit the data corresponding to the codeword resulting in the wrong check result to the first terminal in a case that the determining module determines that the codeword resulting in the wrong check result fed back by the first terminal is an invalid codeword.

Specifically, in a case that the codeword resulting in the wrong check result is not an invalid codeword, that is, the codeword resulting in the wrong check result is the first codeword, it is indicated that the first stream of the three streams of SU-MIMO data is wrong, which indicates that the MU-MIMO data of the first terminal is wrong, therefore, the transmitting module 30 retransmits the data corresponding to the codeword resulting in the wrong check result to the first terminal.

Similarly, the modifying unit 201 is further configured to modify the number of layers RI' of the second terminal to be RI'=k and notify the second terminal of the modification, the number of layers RI' is the number of layers or streams of spatial multiplexing when the second terminal performs data transmission.

The setting unit 202 is further configured to additionally set for the second terminal m virtual demodulation pilot ports corresponding to m streams of MU-MIMO pilot of the first terminal.

The first mapping unit 301 is further configured to map the second codeword of the at least two codewords of the k streams of SU-MIMO data to a layer of the second terminal in a transmission way of the k streams of SU-MIMO pilot and data.

The second mapping unit 302 is further configured to map the layer of the second terminal to a demodulation pilot port in a transmission way of the k streams of SU-MIMO pilot.

The determining module 40 is further configured to determine, in a case that it is received a wrong check result fed back by the second terminal after the second terminal detects and decodes the codewords of the k streams of SU-MIMO data, whether a codeword resulting in the wrong check result is an invalid codeword.

The transmitting module 30 is further configured to retransmit data corresponding to the codeword resulting in the wrong check result to the second terminal in a case that the determining module determines that the codeword resulting in the wrong check result fed back by the second terminal is not an invalid codeword.

The condition of the second terminal is similar as that of the first terminal, and the principle that the apparatus 01 for transmitting MU-MIMO pilot and data performs pilot and data transmission with the second terminal is the same as the principle that the apparatus 01 for transmitting MU-MIMO pilot and data performs pilot and data transmission with the first terminal, which is not described in detail herein.

Similarly, it can be deduced that, in a case that two terminals perform four streams, five streams, six streams, seven streams or eight streams of MU-MIMO pilot and data transmission, the four streams, five streams, six streams, seven streams or eight streams of MU-MIMO pilot and data can be constructed to the corresponding number of streams of SU-MIMO pilot and data in a similar way, to make the pilots orthogonal, which is not described in detail herein.

Similarly, it can be deduced that, in a case that more than two terminals perform three streams, four streams, five streams, six streams, seven streams or eight streams of MU-MIMO pilot and data transmission, the three streams, four streams, five streams, six streams, seven streams or eight streams of MU-MIMO pilot and data can be constructed to the corresponding number of streams of SU-MIMO pilot and data in a similar way, to make the pilots orthogonal, which is not described in detail herein.

In the embodiment of the invention, k streams of SU-MIMO pilot and data are constructed by determining the total number k of streams of MU-MIMO pilot and data transmission performed by the at least two terminal on a same time and frequency resource, the parameters of demodulation pilot ports of the at least two terminals are modified, and the k streams of SU-MIMO pilot and data are transmitted to the terminals. Since the SU-MIMO pilot has good orthogonality and independency, pseudo-orthogonality of the pilots when the two terminals perform MU-MIMO pilot and data transmission can be avoided by the embodiment of the invention.

Figure 6:
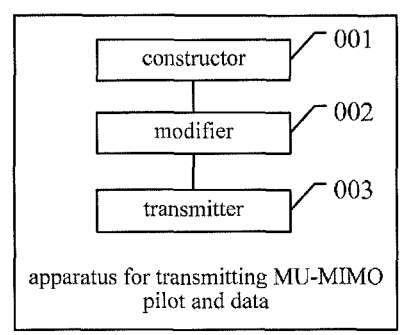
FIG. 6 is a schematic structural diagram of a third embodiment of an apparatus for transmitting MU-MIMO pilot and data according to the invention.

Reference is made to FIG. 6 which is a schematic structural diagram of a third embodiment of the apparatus for transmitting MU-MIMO pilot and data according to the invention. The apparatus for transmitting MU-MIMO pilot and data includes a constructor 001, a modifier 002 and a transmitter 003.

The constructor 001 is configured to construct k streams of Single-user Multiple-Input-Multiple-Output SU-MIMO pilot and data when at least two terminals perform MU-MIMO pilot and data transmission on a same time and frequency resource.

The at least two terminals include a first terminal and a second terminal, the first terminal performs transmission of $L_1$ streams of MU-MIMO pilot and data, and the second terminal performs transmission of $L_2$ streams of MU-MIMO pilot and data, where $$k = \sum_i L_i,$$

and $L_i$ is the number of streams of MU-MIMO pilot and data transmission performed by an ith terminal.

The $L_1$ streams of MU-MIMO pilot and data of the first terminal correspond to $L_1$ weight values, and the $L_1$ streams of MU-MIMO data of the first terminal correspond to p codewords. The $L_2$ streams of MU-MIMO pilot and data of the second terminal correspond to $L_2$ weight values, and the $L_2$ streams of MU-MIMO data of the second terminal correspond to q codewords.

The weight values are used to be synthesized into a weight value matrix of SU-MIMO, and the codewords are used to be synthesized into SU-MIMO data.

The codeword is a bit stream of a service stream from an upper layer after channel coding. The number of bits and the code rate of the channel coding may be different for different codewords.

In LTE R10, p=1 if $L_1$=1, and p=2 if $L_1 \geq 2$, that is, in a case that the first terminal performs a single stream of MU-MIMO data transmission, the single stream of MU-MIMO data transmission corresponds to one codeword, and in a case that the first terminal performs more than two streams of MU-MIMO data transmission, the more than two streams of MU-MIMO data transmission correspond to two codewords, i.e., the MU-MIMO data transmission corresponds to at most two codewords, no matter how many streams of MU-MIMO data transmission are performed by the first terminal. Similarly, q=1 if $L_2$=1, and q=2 if $L_2 \geq 2$, that is, the MU-MIMO data transmission corresponds to at most two codewords, no matter how many streams of MU-MIMO data transmission are performed by the second terminal.

In other protocol, the multiple streams of MU-MIMO data transmission performed by the terminal may correspond to more than two codewords, and in this case, the codewords may be synthesized with reference to the concept of the embodiment of the invention, to achieve pilot and data transmission.

In the embodiment of the invention, the first terminal performs a single stream of MU-MIMO pilot and data transmission, that is, $L_1$=1, and the second terminal performs two streams of MU-MIMO pilot and data transmission, that is, $L_2$=2, for example.

With reference to Table 1 again, it can be seen from Table 1 that, for a terminal that performs three streams of Single-User Multiple-Input-Multiple-Output (SU-MIMO) pilot and data transmission, the three streams of data correspond to two codewords, with the first codeword being mapped to the first layer (that is, the first stream of data) and with the second codeword being mapped to the second layer and the third layer (that is, the second stream of data and the third stream of data). Similarly, for two terminals that perform totally three streams of MU-MIMO pilot and data transmission, for example, the first terminal performs a single stream of MU-MIMO pilot and data transmission and the second terminal performs two streams of MU-MIMO pilot and data transmission in the embodiment of the invention, a design for pilot orthogonality may be conducted by virtual RI with reference to the mapping rule between the codeword and the number of layers shown in Table 1, that is, the MU-MIMO pilot and data of the first terminal and the second terminal are combined on the same time and frequency resource to obtain SU-MIMO pilot and data, and the SU-MIMO pilot and data is transmitted to both the first terminal and the second terminal in a SU-MIMO way. Since the transmission way of SU-MIMO pilot and data has a good orthogonality and independency, pseudo-orthogonality of the pilots when the first terminal and the second terminal perform the MU-MIMO pilot and data transmission is avoided.

In a case that on a same time and frequency resource, the first terminal performs a single stream of MU-MIMO pilot and data transmission, that is, $L_1$=1, and the second terminal performs two streams of MU-MIMO pilot and data transmission, that is, $L_2$=2, the constructor 001 constructs k streams of SU-MIMO pilot and data, where $$k = \sum_i L_i = L_1 + L_2 = 3,$$

the first stream of the three streams of SU-MIMO pilot and data is the single stream of MU-MIMO pilot and data of the first terminal, and the second stream and the third stream are the two streams of MU-MIMO pilot and data of the second terminal.

Since the terminal detects the data and feeds back ACK/NACK according to the codeword, the first terminal that performs the single stream of MU-MIMO data transmission is to occupy one codeword, and the second terminal that performs the two streams of MU-MIMO data transmission is to occupy two codewords. One codeword of the two codewords corresponding to the second terminal may be selected and then combined with the codeword of the first terminal to obtain two codewords to be used for the SU-MIMO transmission, and the mapping between the codewords and the layers is achieved by using a transmission way of SU-MIMO pilot and data of a single terminal with RI=3, with the first codeword corresponding to the single stream of MU-MIMO data of the first terminal and with the second codeword corresponding to the two streams of MU-MIMO data of the second terminal. In this case, the other codeword of the second terminal that is not mapped may be processed in a next sub-frame in a similar way. Alternatively, the mapping of the other codeword of the second terminal may be completed in a retransmission way of the other codeword of a single terminal.

If there is idle resource, operations such as codeword cascade and codeword interception may be performed on the two codewords of the second terminal, to obtain a combination of the two codewords which is taken as the second codeword of the three streams of SU-MIMO data, therefore, all codewords can be transmitted by one transmission.

The modifier 002 is configured to modify parameters of demodulation pilot ports of the at least two terminals in a configuration way of the k streams of SU-MIMO pilot.

The parameters of the demodulation pilot ports include the number of layers RI, the number of demodulation pilot ports and a SCID value.

The actual number of layers RI of the first terminal equals to 1 (the actual number of codewords is also 1, and one codeword is mapped to one layer), the modifier 002 modifies RI of the first terminal to be 3, and informs the first terminal of RI=3 by DCI.

In this case, the number of streams of the data of the first terminal is virtualized from one to three, therefore, three corresponding demodulation pilot ports are required. Compared with the original configuration of one stream, the modifier 002 additionally sets two virtual demodulation pilot ports for the first terminal, which correspond to the two streams of MU-MIMO pilot and data of the second terminal.

Similarly, the modifier 002 modifies RI' of the second terminal to be 3, and informs the second terminal of RI'=3 by DCI. Accordingly, the modifier 002 additionally sets one demodulation pilot port for the second terminal, which corresponds to the single stream of MU-MIMO pilot and data of the first terminal, the details thereof is not described herein.

The modifier 002 configures a demodulation pilot port for the first stream of the first terminal to be Port7&(SCID=0 or 1), configures a demodulation pilot port for the second stream of the second terminal to be Port8&(with its SCID value being the same as the SCID value of the demodulation pilot port Port7 of the first terminal), and configures a demodulation pilot port for the third stream of the second terminal to be Port9&(SCID=0 or 1).

Figure 7:
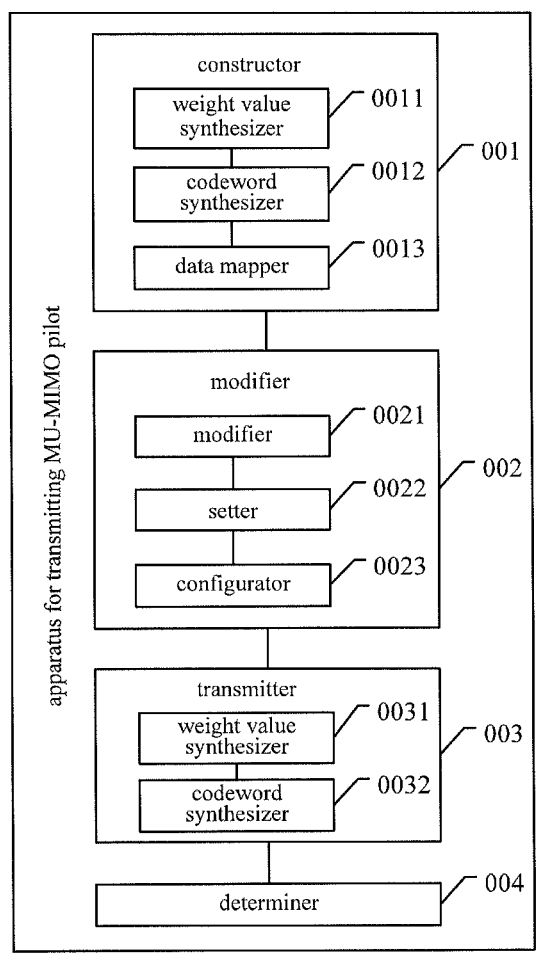
FIG. 7 is a schematic structural diagram of a fourth embodiment of an apparatus for transmitting MU-MIMO pilot and data according to the invention.

Reference is made to FIG. 7 which is a schematic structural diagram of a fourth embodiment of the apparatus for transmitting MU-MIMO pilot and data according to the invention. The apparatus for transmitting MU-MIMO pilot and data includes the constructor 001, the modifier 002 and the transmitter 003 in the above embodiment. In the embodiment, the apparatus for transmitting pilot and data further includes a determiner 004.

The constructor 001 includes a weight value synthesizer 0011, a codeword synthesizer 0012 and a data mapper 0013.

The weight value synthesizer 0011 is configured to combine $L_1$ weight values of the $L_1$ streams of MU-MIMO pilot and data of the first terminal and $L_2$ weight values of the $L_2$ streams of MU-MIMO pilot and data of the second terminal in sequence, to obtain k weight values of the k streams of SU-MIMO pilot and data.

The weight value of the single stream of MU-MIMO pilot and data of the first terminal is:

$$W_{usr0} = \begin{bmatrix} w_{00}^{usr0} \\ w_{10}^{usr0} \\ \vdots \\ w_{(N-1)0}^{usr0} \end{bmatrix} = [w_0^{usr0}]$$

The two weight values of the two streams of MU-MIMO pilot and data of the second terminal are:

$$W_{usr1} = \begin{bmatrix} w_{00}^{usr1} & w_{01}^{usr1} \\ w_{10}^{usr1} & w_{11}^{usr1} \\ \vdots & \vdots \\ w_{(N-1)0}^{usr1} & w_{(N-1)1}^{usr1} \end{bmatrix} = [w_0^{usr1} \; w_1^{usr1}]$$

Similarly, a weight value matrix of a single terminal performing three streams of SU-MIMO pilot and data transmission with the number of layers being RI=3 is:

$$W = [w_0 \; w_1 \; w_2]$$

The weight value synthesizer 0011 combines one weight value of the single stream of MU-MIMO pilot and data of the first terminal and two weight values of the two streams of MU-MIMO pilot and data of the second terminal in sequence, to obtain three weight values of the three streams of SU-MIMO pilot and data as follows:

$$W = [w_0^{usr0} \; w_0^{usr1} \; w_1^{usr1}]$$

It is to be noted that, the LTE R10 protocol specifies that the demodulation pilot port of the first stream of three streams of SU-MIMO must be mapped to Port7, therefore, the first weight value of the three weight values of the three streams of SU-MIMO pilot and data should correspond to Port7, that is, the first weight value should be at the first position among the three weight values.

With reference to Table 2 again, in Table 2, the first column represents a correspondence among the number of streams of SU-MIMO, the demodulation pilot port and the SCID in a case that there is only one codeword, and the second column represents a correspondence among the number of streams of SU-MIMO, the demodulation pilot port and the SCID in a case that there are two codewords. It can be seen that in a case that the number of streams is 3, the demodulation pilot port of the first stream must be mapped to Port7.

Accordingly, the transmitter 003 transmits the following three streams of SU-MIMO data constructed by the constructor 001 to the first terminal and the second terminal:

$$\begin{aligned} S_{DataTx} &= [w_0^{usr0} \; w_0^{usr1} \; w_1^{usr1}] \cdot s \\ &= [w_0^{usr0} \; w_0^{usr1} \; w_1^{usr1}] \cdot \begin{bmatrix} s_{usr0,0} \\ s_{usr1,0} \\ s_{usr1,1} \end{bmatrix} \\ &= w_0^{usr0} s_{usr0,0} + w_0^{usr1} s_{usr1,0} + w_1^{usr1} s_{usr1,1} \end{aligned}$$

The codeword synthesizer 0012 is configured to take any one of the p codewords of the $L_1$ streams of MU-MIMO data of the first terminal as the first codeword of at least two codewords of the k streams of SU-MIMO data, and take any one of the q codewords of the $L_2$ streams of MU-MIMO data of the second terminal as the second codeword of the at least two codewords of the k streams of SU-MIMO data.

With reference to Table 3 again, it can be seen from Table 3 that, the LTE R10 protocol specifies that the maximum number of codewords of a single terminal is 2, and in the embodiment of the invention, the first terminal that performs the single stream of MU-MIMO pilot and data transmission occupies one codeword, and the second terminal that performs the two streams of MU-MIMO pilot and data transmission occupies two codewords, therefore, there are totally three codewords; the SU-MIMO with RI=3 is employed for transmission and three codewords are required to be mapped to two codewords.

The codeword synthesizer 0012 takes one codeword of the single stream of MU-MIMO data of the first terminal as the first codeword of the three streams of SU-MIMO data, and takes any one of two codewords of the two streams of MU-MIMO data of the second terminal as the second codeword of the three streams of SU-MIMO data.

In this case, the other codeword of the second terminal that is not used may be processed in a next sub-frame in a similar way. Alternatively, the mapping of the other codeword of the second terminal may be completed in a retransmission way of the other codeword of a single terminal.

It is to be noted that, in a case that the number of streams of the MU-MIMO pilot and data of one of the two terminals is less, it is preferable to take any one or a combination of codewords of the terminal with the less number of streams of MU-MIMO pilot and data as the first codeword of the k streams of SU-MIMO pilot and data.

The codeword synthesizer 0012 may further perform operations such as codeword cascade and codeword interception on the two codewords of the two streams of MU-MIMO data of the second terminal, to obtain a combination of the two codewords as the second codeword of at least two codewords of the k streams of SU-MIMO data.

The data mapper 0013 is configured to map the first codeword to the $L_1$ streams of MU-MIMO data of the first terminal, and map the second codeword to the $L_2$ streams of MU-MIMO data of the second terminal.

Specifically, the data mapper 0013 maps the first codeword of the three streams of SU-MIMO pilot and data to the single stream of MU-MIMO data of the first terminal, and maps the second codeword of the three streams of SU-MIMO pilot and data to the two streams of MU-MIMO data of the second terminal.

In this case, there is still one codeword in the second terminal that is not mapped, and the one codeword that is not mapped is processed in a next sub-frame in a similar way. Alternatively, the mapping of the codeword that is not mapped may be completed in a retransmission way of the codeword of a single terminal.

The modifier 002 includes a modifier 0021, a setter 0022 and a configurator 0023.

The modifier 0021 is configured to modify the number of layers RI of the first terminal to be RI=k and notify the first terminal of the modification, where the number of layers RI is the number of layers or streams of spatial multiplexing when the first terminal performs data transmission.

The number of layers RI corresponds to the number of streams of the pilot and data transmission performed by the first terminal. In a case that the first terminal performs a one stream of MU-MIMO pilot and data transmission, the number of layers RI thereof equals to 1. In a case that the apparatus for transmitting MU-MIMO pilot and data is to transmit three streams of SU-MIMO pilot and data to the first terminal, the modifier 0021 needs to modify the number of layers RI of the first terminal to be RI=3, and inform the first terminal of RI=3 through DCI.

The setter 0022 is configured to additionally set $L_2$ demodulation pilot ports for the first terminal, which correspond to the $L_2$ streams of MU-MIMO pilot of the second terminal.

In this case, the number of streams of the pilot and data transmission of the first terminal is increased from one to three, therefore, three corresponding demodulation pilot ports are required. Compared with the configuration of one stream of MU-MIMO pilot and data, the setter 0022 additionally sets two demodulation pilot ports for the first terminal, that is, the demodulation pilot ports of the first terminal are Port7, Port8 and Port9, where Port7 and Port8 are on a same time and frequency resource.

The configurator 0023 is configured to configure all of Scrambling identity (SCID) values of the demodulation pilot ports on the same time and frequency resource to be 0 or configure all of Scrambling identity (SCID) values of the demodulation pilot ports on the same time and frequency resource to be 1.

Specifically, the configurator 0023 configures all of the SCID values of the demodulation pilot ports Port7 and Port8 on a same time and frequency resource to be 0 or to be 1.

Preferably, the first codeword of the three streams of SU-MIMO data is mapped to the single stream of MU-MIMO data of the first terminal, that is, the first codeword of the three streams of SU-MIMO data corresponds to the demodulation pilot port Port7 of the first terminal, the first terminal can demodulate only one stream of data corresponding to the first codeword of the three streams of SU-MIMO data, therefore, the configurator 0023 configures the demodulation pilot port for the first stream of the first terminal to be Port7&(SCID=0 or 1), but does not configure the demodulation pilot ports for the second stream and the third stream of the first terminal, which are reserved for the second terminal for pilot transmission.

In the embodiment of the invention, the first terminal only uses Port7, and the second terminal uses Port8 and Port9, with Port7 and Port8 being on a same time and frequency resource, therefore, the configurator 0023 configures the SCID value of the demodulation pilot port Port8 of the second terminal to be the same as the SCID value of the demodulation pilot port Port7 of the first terminal. The configurator 0023 may configure the SCID value of the demodulation pilot port Port9 of the second terminal to 0 or 1 arbitrarily.

The transmitter 003 includes a first mapper 0031 and a second mapper 0032.

The first mapper 0031 is configured to map the first codeword of at least two codewords of the k streams of SU-MIMO data to a layer of the first terminal in a transmission way of the k streams of SU-MIMO pilot and data.

Specifically, the first mapper 0031 maps the first codeword of the three streams of SU-MIMO data to the first layer of the first terminal in the transmission way of the k streams of SU-MIMO pilot and data.

The second mapper 0032 is configured to map the layer of the first terminal to a demodulation pilot port in the transmission way of the k streams of SU-MIMO pilot.

Specifically, the second mapper 0032 maps the first layer of the first terminal to a demodulation pilot port Port7 of the first terminal in the transmission way of the k streams of SU-MIMO pilot.

The determiner 004 is configured to determine, in a case that it is received a wrong check result fed back by the first terminal after the first terminal detects and decodes the codewords of the k streams of SU-MIMO data, whether a codeword resulting in the wrong check result is an invalid codeword.

After the transmitter 003 transmits the three streams of SU-MIMO pilot and data constructed by the constructor 001 to the first terminal, the first terminal demodulates the three streams of SU-MIMO pilot and data in a demodulation way of three streams of SU-MIMO pilot and data. Specifically, the first terminal detects and decodes the two codewords of the three streams of SU-MIMO data, and feeds back a check result of CRC, including ACK/NACK.

In a case that the determiner 004 receives a wrong (NACK) check result fed back by the first terminal after the first terminal detects the two codewords of the three streams of SU-MIMO data, the determiner 004 determines whether the codeword resulting in the wrong check result is an invalid codeword.

In a case that the codeword resulting in the wrong check result is an invalid codeword, i.e., the second codeword, it is determined that the second stream and the third stream of the three streams of SU-MIMO data are wrong. Since the first stream is the MU-MIMO data of the first terminal, the first terminal only concerns the first stream of the three streams of SU-MIMO data, and the wrong second stream or third stream does not affect the first terminal, so data retransmission is not needed.

Since the base station knows which codeword of the first terminal is an invalid codeword, the base station directly disregards the fed check result. If the wrong check result is due to a desired codeword, data retransmission is performed.

The transmitter 003 is further configured to retransmit the data corresponding to the codeword resulting in the wrong check result to the first terminal in a case that the determining module determines that the codeword resulting in the wrong check result fed back by the first terminal is an invalid codeword.

Specifically, in a case that the codeword resulting in the wrong check result is not an invalid codeword, that is, the codeword resulting in the wrong check result is the first codeword, it is indicated that the first stream of the three streams of SU-MIMO data is wrong, which indicates that the MU-MIMO data of the first terminal is wrong, therefore, the transmitter 003 retransmits the data corresponding to the codeword resulting in the wrong check result to the first terminal.

Similarly, the modifier 0021 is further configured to modify the number of layers RI' of the second terminal to be RI'=k and notify the second terminal of the modification, the number of layers RI' is the number of layers or streams of spatial multiplexing when the second terminal performs data transmission.

The setter 0022 is further configured to additionally set for the second terminal m virtual demodulation pilot ports corresponding to m streams of MU-MIMO pilot of the first terminal.

The first mapper 0031 is further configured to map the second codeword of the at least two codewords of the k streams of SU-MIMO data to a layer of the second terminal in a transmission way of the k streams of SU-MIMO pilot and data.

The second mapper 0032 is further configured to map the layer of the second terminal to a demodulation pilot port in a transmission way of the k streams of SU-MIMO pilot.

The determiner 004 is further configured to determine, in a case that it is received a wrong check result fed back by the second terminal after the second terminal detects and decodes the codewords of the k streams of SU-MIMO data, whether a codeword resulting in the wrong check result is an invalid codeword.

The transmitter 003 is further configured to retransmit data corresponding to the codeword resulting in the wrong check result to the second terminal in a case that the determining module determines that the codeword resulting in the wrong check result fed back by the second terminal is not an invalid codeword.

The condition of the second terminal is similar as that of the first terminal, and the principle that the apparatus for transmitting MU-MIMO pilot and data performs pilot and data transmission with the second terminal is the same as the principle that the apparatus for transmitting MU-MIMO pilot and data performs pilot and data transmission with the first terminal, which is not described in detail herein.

Similarly, it can be deduced that, in a case that two terminals perform four streams, five streams, six streams, seven streams or eight streams of MU-MIMO pilot and data transmission, the four streams, five streams, six streams, seven streams or eight streams of MU-MIMO pilot and data can be constructed to the corresponding number of streams of SU-MIMO pilot and data in a similar way, to make the pilots orthogonal, which is not described in detail herein.

Similarly, it can be deduced that, in a case that more than two terminals perform three streams, four streams, five streams, six streams, seven streams or eight streams of MU-MIMO pilot and data transmission, the three streams, four streams, five streams, six streams, seven streams or eight streams of MU-MIMO pilot and data can be constructed to the corresponding number of streams of SU-MIMO pilot and data in a similar way, to make the pilots orthogonal, which is not described in detail herein.

In the embodiment of the invention, k streams of SU-MIMO pilot and data are constructed by determining the total number k of streams of MU-MIMO pilot and data transmission performed by the at least two terminal on a same time and frequency resource, the parameters of demodulation pilot ports of the at least two terminals are modified, and the k streams of SU-MIMO pilot and data are transmitted to the terminals. Since the SU-MIMO pilot has good orthogonality and independency, pseudo-orthogonality of the pilots when the two terminals perform MU-MIMO pilot and data transmission can be avoided by the embodiment of the invention.

Figure 8:
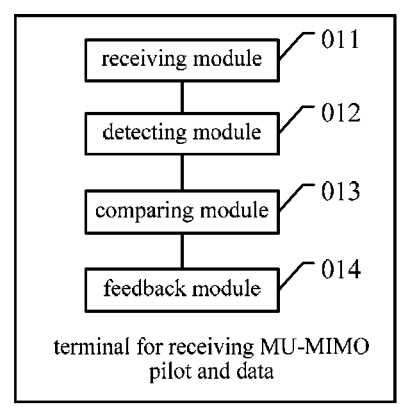
FIG. 8 is a schematic structural diagram of a terminal for receiving MU-MIMO pilot and data according to an embodiment of the invention.

Reference is made to FIG. 8 which is a schematic structural diagram of a terminal for receiving MU-MIMO pilot and data according to an embodiment of the invention. The terminal includes a receiving module 011, a detecting module 012, a comparing module 013 and a feedback module 014.

The receiving module 011 is configured to receive constructed k streams of SU-MIMO pilot and data.

The k streams of SU-MIMO pilot and data are constructed based on $L_i$ streams of MU-MIMO pilot and data of at least two terminals receiving MU-MIMO pilot and data, where $$k = \sum_i L_i,$$

and $L_i$ is the number of streams of MU-MIMO pilot and data transmission performed by an ith terminal. The MU-MIMO pilot and data transmission is nontransparent.

In the embodiment of the invention, there are, for example two terminals for receiving MU-MIMO pilot and data which perform nontransparent MU-MIMO pilot and data transmission with the apparatus for transmitting MU-MIMO pilot and data, that is, a terminal A for receiving MU-MIMO pilot and data and a terminal B for receiving MU-MIMO pilot and data. Specifically, the terminal A for receiving MU-MIMO pilot and data performs nontransparent transmission of $L_3$ streams of MU-MIMO pilot and data, where $L_3=1$, and the terminal B for receiving MU-MIMO pilot and data performs nontransparent transmission of $L_4$ streams of MU-MIMO pilot and data, where $L_4=2$. The k streams of SU-MIMO pilot and data are constructed based on the $L_3$ streams of MU-MIMO pilot and data of the terminal A for receiving MU-MIMO pilot and data and the $L_4$ streams of MU-MIMO pilot and data of the terminal B for receiving MU-MIMO pilot and data, where $$k = \sum_i L_i = 3.$$

The processes of constructing and transmitting the k streams of SU-MIMO pilot and data have been illustrated in detail in the above embodiment of the apparatus 01 for transmitting MU-MIMO pilot and data, which is not described in detail herein.

In a case that the apparatus 01 for transmitting MU-MIMO pilot and data transmits the constructed three streams of SU-MIMO pilot and data to the terminal A for receiving MU-MIMO pilot and data, the receiving module 011 receives the constructed three streams of SU-MIMO pilot and data.

The detecting module 012 is configured to detect energy of demodulation pilot ports corresponding to at least two codewords of the k streams of SU-MIMO data.

Since the MU-MIMO pilot and data transmission performed by the terminal A for receiving MU-MIMO pilot and data is nontransparent, that is, the apparatus for transmitting MU-MIMO pilot and data does not know which codeword of the terminal A for receiving MU-MIMO pilot and data is an invalid codeword, the detecting module 012 may determine a valid codeword and an invalid codeword by detecting energy of positions of pilots corresponding to the two codewords of the three streams of SU-MIMO data. Therefore, the terminal A for receiving MU-MIMO pilot and data may not detect and decode the invalid codeword, but directly feedback CRC=0 or 1 for the invalid codeword (Code Word, CW). In this way, calculation complexity is reduced, and the apparatus for transmitting MU-MIMO pilot and data does not perform any processing for the feedback result of the invalid codeword.

Figure 9:
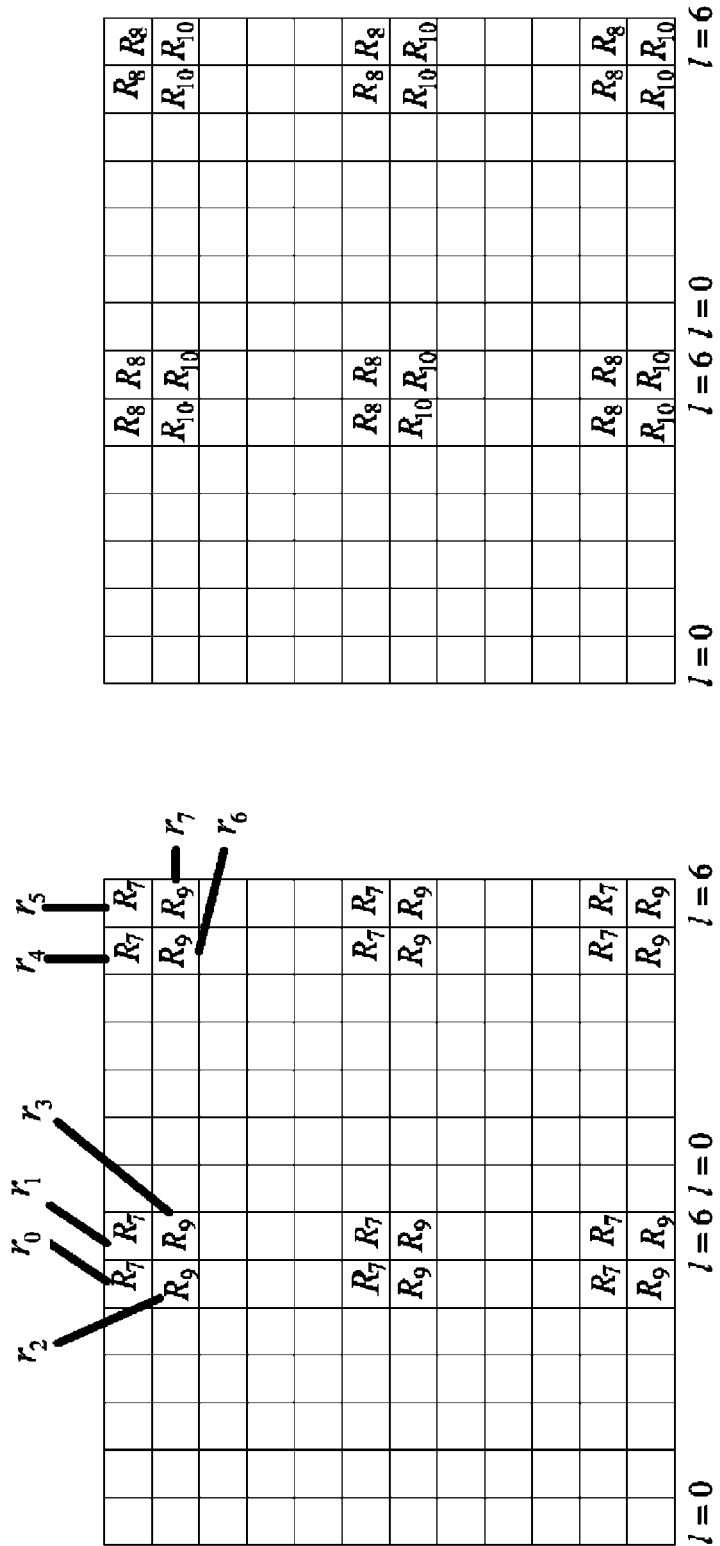
FIG. 9 is a schematic diagram of demodulation pilot position patterns in the LTE R10 protocol.

Reference is made to FIG. 9 which is a schematic diagram of demodulation pilot position patterns in the LTE R10 protocol. The Walsh code for distinguishing is as follows:

$$r_0 = H_0 w_{00} s_0^{scid0} + q \cdot H_0 w_{01} s_0^{scid0} + I_{00} + n_{00}$$

$$r_1 = H_0 w_{00} s_1^{scid0} + \bar{q} \cdot H_0 w_{01} s_1^{scid0} + I_{01} + n_{01}$$

where $r_0$ and $r_1$ are signals received by a demodulation pilot port port7, q represents a Walsh code element corresponding to the demodulation pilot port port7, q=−1 or 1, q=1→$\bar{q}$=−1, scid0 represents a Scrambling identity of a demodulation pilot port, scid0 is SCID=0, $I_{00}$ represents interference, $n_{00}$ represents noise, $w_{00}$ represents a weight value of the first layer, and $H_0$ represents a frequency domain channel response from the base station to the terminal.

A equivalent channel of a stream corresponding to the demodulation pilot port port7 may be obtained by using signals $r_0$ and $r_1$ received by the demodulation pilot port port7:

$$H_{port7,LS} = \hat{H}_0 \hat{w}_{00}$$

$$= \frac{r_0 \cdot (s_0^{scid0})^* + r_1 \cdot (s_1^{scid0})^*}{2}$$

$$= \frac{H_0 w_{00} + I_{00}(s_0^{scid0})^* + n_{00}(s_0^{scid0})^* + H_0 w_{00} + I_{01}(s_1^{scid0})^* + n_{01}(s_1^{scid0})^*}{2}$$

$$= H_0 w_{00} + \frac{I_{00}(s_0^{scid0})^* + n_{00}(s_0^{scid0})^* + I_{01}(s_1^{scid0})^* + n_{01}(s_1^{scid0})^*}{2}$$

where $H_{port7,LS}$ is a frequency domain equivalent channel response corresponding to the pilot port port7. Similarly, $H_{port8,LS}$ may be obtained by a difference between $r_1$ and $r_0$.

Similarly, the equivalent channel $H_{port9,LS}$ of a stream corresponding to a pilot port port9 may be obtained based on $r_2$ and $r_3$.

The comparing module 013 is configured to compare the energy of the demodulation pilot ports, to determine an invalid codeword.

Specifically, the comparing module 013 compares the energy of the demodulation pilot ports, to determine an invalid codeword.

$|H_{port7,LS}|^2 > |H_{port9,LS}|^2$ indicates that the terminal A for receiving MU-MIMO pilot and data uses Port7/8, and the valid codeword is the first codeword, therefore the invalid codeword is the second codeword.

The feedback module 014 is configured to feed back a check result being 0 or 1 for the invalid codeword.

On the basis that the terminal A for receiving MU-MIMO pilot and data uses Port7/8, the valid codeword is the first codeword and the invalid codeword is the second codeword determined by the comparing module 013, CRC=0 or 1 for the second codeword may be fed back directly.

Therefore, for a nontransparent MU-MIMO transmission, that is, the apparatus for transmitting MU-MIMO pilot and data does not know which codeword of the terminal A for receiving MU-MIMO pilot and data is an invalid codeword, the terminal A for receiving MU-MIMO pilot and data may determine a valid codeword and an invalid codeword by detecting energy of pilot positions corresponding to two codewords of the three streams of SU-MIMO data, therefore, the first terminal may not detect and decode the invalid codeword, but directly feedback CRC=0 or 1 for the invalid codeword CW. In this way, calculation complexity is reduced, and the apparatus for transmitting MU-MIMO pilot and data does not perform any subsequent processing on the invalid codeword.

Figure 10:
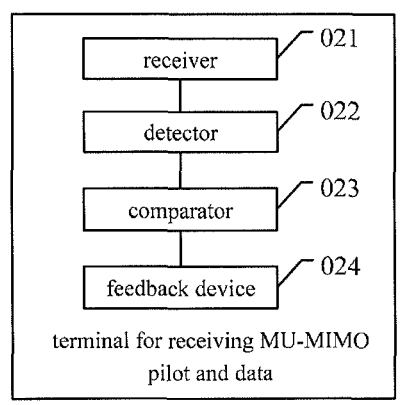
FIG. 10 is a schematic structural diagram of another terminal for receiving MU-MIMO pilot and data according to an embodiment of the invention.

Reference is made to FIG. 10 which is a schematic structural diagram of another terminal for receiving MU-MIMO pilot and data according to an embodiment of the invention. The terminal includes a receiver 021, a detector 022, a comparator 023 and a feedback device 024.

The receiver 021 is configured to receive constructed k streams of SU-MIMO pilot and data.

The k streams of SU-MIMO pilot and data are constructed based on $L_1$ streams of MU-MIMO pilot and data of at least two terminals receiving MU-MIMO pilot and data, where $$k = \sum_i L_i,$$

and $L_i$ is the number of streams of MU-MIMO pilot and data transmission performed by an ith terminal. The MU-MIMO pilot and data transmission is nontransparent.

In the embodiment of the invention, there are, for example two terminals for receiving MU-MIMO pilot and data which perform nontransparent MU-MIMO pilot and data transmission with the apparatus for transmitting MU-MIMO pilot and data, that is, a terminal A for receiving MU-MIMO pilot and data and a terminal B for receiving MU-MIMO pilot and data. Specifically, the terminal A for receiving MU-MIMO pilot and data performs nontransparent transmission of $L_3$ streams of MU-MIMO pilot and data, where $L_3=1$, and the terminal B for receiving MU-MIMO pilot and data performs nontransparent transmission of $L_4$ streams of MU-MIMO pilot and data, where $L_4=2$. The k streams of SU-MIMO pilot and data are constructed based on the $L_3$ streams of MU-MIMO pilot and data of the terminal A for receiving MU-MIMO pilot and data and the $L_4$ streams of MU-MIMO pilot and data of the terminal B for receiving MU-MIMO pilot and data, where $$k = \sum_i L_i = 3.$$

The processes of constructing and transmitting the k streams of SU-MIMO pilot and data have been illustrated in detail in the above embodiment of the apparatus 01 for transmitting MU-MIMO pilot and data, which is not described in detail herein.

In a case that the apparatus for transmitting MU-MIMO pilot and data transmits the constructed three streams of SU-MIMO pilot and data to the terminal A for receiving MU-MIMO pilot and data, the receiver 021 receives the constructed three streams of SU-MIMO pilot and data.

The detector 022 is configured to detect energy of demodulation pilot ports corresponding to at least two codewords of the k streams of SU-MIMO data.

Since the MU-MIMO pilot and data transmission performed by the terminal A for receiving MU-MIMO pilot and data is nontransparent, that is, the apparatus for transmitting MU-MIMO pilot and data does not know which codeword of the terminal A for receiving MU-MIMO pilot and data is an invalid codeword, the detector 022 may determine a valid codeword and an invalid codeword by detecting energy of positions of pilots corresponding to the two codewords of the three streams of SU-MIMO data. Therefore, the terminal A for receiving MU-MIMO pilot and data may not detect and decode the invalid codeword, but directly feedback invalid codeword CW CRC=0 or 1. In this way, calculation complexity is reduced, and the apparatus for transmitting MU-MIMO pilot and data does not perform any processing for the feedback result of the invalid codeword.

Reference is made to FIG. 9 again which is a schematic diagram of demodulation pilot position patterns in the LTE R10 protocol. The Walsh code for distinguishing is as follows:

$$r_0 H_0 w_{00} s_0^{scid0} + q \cdot H_0 w_{01} s_0^{scid0} + I_{00} + n_{00}$$

$$r_1 = H_0 w_{00} s_1^{scid0} + \bar{q} \cdot H_0 w_{01} s_1^{scid0} + I_{01} + n_{01}$$

where $r_0$ and $r_1$ are signals received by a demodulation pilot port port7, q represents a Walsh code element corresponding to the demodulation pilot port port7, $q=-1$ or 1, $q=1 \to \bar{q}=-1$, scid0 represents a Scrambling identity of a demodulation pilot port, scid0 is SCID=0, $I_{00}$ represents interference, $n_{00}$ represents noise, $w_{00}$ represents a weight value of the first layer, and $H_0$ represents a frequency domain channel response from the base station to the terminal.

A equivalent channel of a stream corresponding to the demodulation pilot port port7 may be obtained by using signals $r_0$ and $r_1$ received by the demodulation pilot port port7:

$$H_{port7,LS} = \hat{H}_0 \hat{w}_{00}$$

$$= \frac{r_0 \cdot (s_0^{scid0})^* + r_1 \cdot (s_1^{scid0})^*}{2}$$

$$= \frac{\begin{array}{c} H_0 w_{00} + I_{00}(s_0^{scid0})^* + n_{00}(s_0^{scid0})^* + H_0 w_{00} + \\ I_{01}(s_1^{scid0})^* + n_{01}(s_1^{scid0})^* \end{array}}{2}$$

$$= H_0 w_{00} + \frac{\begin{array}{c} I_{00}(s_0^{scid0})^* + n_{00}(s_0^{scid0})^* + I_{01}(s_1^{scid0})^* + \\ n_{01}(s_1^{scid0})^* \end{array}}{2}$$

where $H_{port7, LS}$ is a frequency domain equivalent channel response corresponding to the pilot port port7. Similarly, $H_{port8, LS}$ may be obtained by a difference between $r_1$ and $r_0$.

Similarly, the equivalent channel $H_{port9, LS}$ of a stream corresponding to a pilot port port9 may be obtained based on $r_2$ and $r_3$.

The comparator 023 is configured to compare the energy of the demodulation pilot ports, to determine an invalid codeword.

Specifically, the comparator 023 compares the energy of the demodulation pilot ports, to determine an invalid codeword.

$|H_{port7, LS}|^2 > |H_{port9, LS}|^2$ indicates that the terminal A for receiving MU-MIMO pilot and data uses Port7/8, and the valid codeword is the first codeword, therefore the invalid codeword is the second codeword.

The feedback device 024 is configured to feed back a check result being 0 or 1 for the invalid codeword.

On the basis that the terminal A for receiving MU-MIMO pilot and data uses Port7/8, the valid codeword is the first codeword and the invalid codeword is the second codeword determined by the comparator 023, CRC=0 or 1 for the second codeword may be fed back directly.

Therefore, for a nontransparent MU-MIMO transmission, that is, the apparatus for transmitting MU-MIMO pilot and data does not know which codeword of the terminal A for receiving MU-MIMO pilot and data is an invalid codeword, the terminal A for receiving MU-MIMO pilot and data may determine a valid codeword and an invalid codeword by detecting energy of pilot positions corresponding to two codewords of the three streams of SU-MIMO data, therefore the first terminal may not detect and decode the invalid codeword, but directly feedback CRC=0 or 1 for the invalid codeword CW. In this way, calculation complexity is reduced, and the apparatus for transmitting MU-MIMO pilot and data does not perform any subsequent processing on the invalid codeword.

Figure 11:
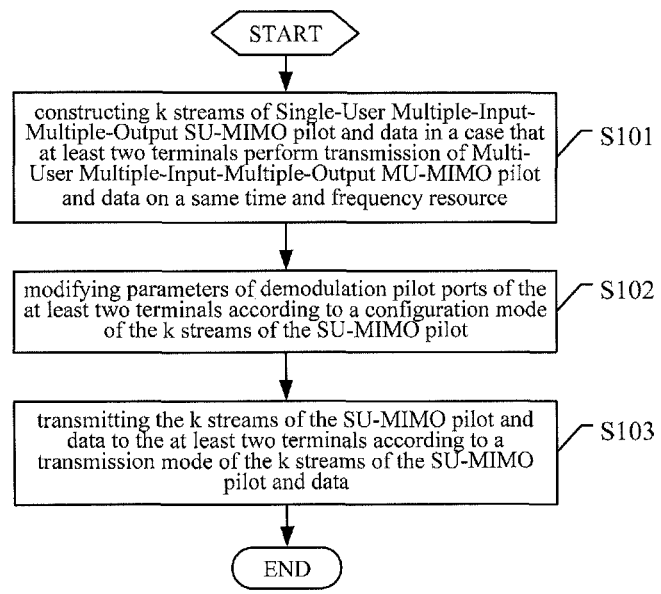
FIG. 11 is a schematic flow chart of a method for transmitting MU-MIMO pilot and data according to an embodiment of the invention.

Reference is made to FIG. 11 which is a schematic structural diagram of a method for transmitting MU-MIMO pilot and data according to an embodiment of the invention. The method includes S101 to S103.

In S101, k streams of Single-user Multiple-Input-Multiple-Output SU-MIMO pilot and data are constructed when at least two terminals perform MU-MIMO pilot and data transmission on a same time and frequency resource.

The at least two terminals include a first terminal and a second terminal, the first terminal performs transmission of $L_1$ streams of MU-MIMO pilot and data, and the second terminal performs transmission of $L_2$ streams of MU-MIMO pilot and data, where $$k = \sum_i L_i,$$

and $L_i$ is the number of streams of MU-MIMO pilot and data transmission performed by an ith terminal.

The $L_1$ streams of MU-MIMO pilot and data of the first terminal correspond to $L_1$ weight values, and the $L_1$ streams of MU-MIMO data of the first terminal correspond to p codewords. The $L_2$ streams of MU-MIMO pilot and data of the second terminal correspond to $L_2$ weight values, and the $L_2$ streams of MU-MIMO data of the second terminal correspond to q codewords.

The weight values are used to be synthesized into a weight value matrix of SU-MIMO, and the codewords are used to be synthesized into SU-MIMO data.

The codeword is a bit stream of a service stream from an upper layer after channel coding. The number of bits and the code rate of the channel coding may be different for different codewords.

In LTE R10, p=1 if $L_1$=1, and p=2 if $L_1 \geq 2$, that is, in a case that the first terminal performs a single stream of MU-MIMO data transmission, the single stream of MU-MIMO data transmission corresponds to one codeword, and in a case that the first terminal performs more than two streams of MU-MIMO data transmission, the more than two streams of MU-MIMO data transmission correspond to two codewords, i.e., the MU-MIMO data transmission corresponds to at most two codewords, no matter how many streams of MU-MIMO data transmission are performed by the first terminal. Similarly, q=1 if $L_2$=1, and q=2 if $L_2 \geq 2$, that is, the MU-MIMO data transmission corresponds to at most two codewords, no matter how many streams of MU-MIMO data transmission are performed by the second terminal.

In other protocol, the multiple streams of MU-MIMO data transmission performed by the terminal may correspond to more than two codewords, and in this case, the codewords may be synthesized with reference to the concept of the embodiment of the invention, to achieve pilot and data transmission.

In the embodiment of the invention, the first terminal performs a single stream of MU-MIMO pilot and data transmission, that is, $L_1$=1, and the second terminal performs two streams of MU-MIMO pilot and data transmission, that is, $L_2$=2, for example.

With reference to Table 1 again, it can be seen from Table 1 that, for a terminal that performs three streams of SU-MIMO pilot and data transmission, the three streams of data correspond to two codewords, with the first codeword being mapped to the first layer and with the second codeword being mapped to the second layer and the third layer. Similarly, for two terminals that perform totally three streams of MU-MIMO pilot and data transmission, for example, the first terminal performs a single stream of MU-MIMO pilot and data transmission and the second terminal performs two streams of MU-MIMO pilot and data transmission in the embodiment of the invention, a design for pilot orthogonality may be conducted by virtual RI with reference to the mapping rule between the codeword and the number of layers shown in Table 1, that is, the MU-MIMO pilot and data of the first terminal and the second terminal are combined on the same time and frequency resource to obtain SU-MIMO pilot and data, and the SU-MIMO pilot and data is transmitted to both the first terminal and the second terminal in a SU-MIMO way. Since the transmission way of SU-MIMO pilot and data has a good orthogonality and independency, pseudo-orthogonality of the pilots when the first terminal and the second terminal perform the MU-MIMO pilot and data transmission is avoided.

In a case that on a same time and frequency resource, the first terminal performs a single stream of MU-MIMO pilot and data transmission, that is, $L_1$=1, and the second terminal performs two streams of MU-MIMO pilot and data transmission, that is, $L_2$=2, the apparatus for transmitting MU-MIMO pilot and data constructs k streams of SU-MIMO pilot and data where $$k = \sum_i L_i = L_1 + L_2 = 3,$$

the first stream of the three streams of SU-MIMO pilot and data is the single stream of MU-MIMO pilot and data of the first terminal, and the second stream and the third stream are the two streams of MU-MIMO pilot and data of the second terminal.

Since the terminal detects the data and feeds back ACK/NACK according to the codeword, the first terminal that performs the single stream of MU-MIMO data transmission is to occupy one codeword, and the second terminal that performs the two streams of MU-MIMO data transmission is to occupy two codewords. One codeword of the two codewords corresponding to the second terminal may be selected and then combined with the codeword of the first terminal to obtain two codewords to be used for the SU-MIMO transmission, and the mapping between the codewords and the layers is achieved by using a transmission way of SU-MIMO pilot and data of a single terminal with RI=3, with the first codeword corresponding to the single stream of MU-MIMO data of the first terminal and with the second codeword corresponding to the two streams of MU-MIMO data of the second terminal. In this case, the other codeword of the second terminal that is not mapped may be processed in a next sub-frame in a similar way. Alternatively, the mapping of the other codeword of the second terminal may be completed in a retransmission way of the other codeword of a single terminal.

If there is idle resource, operations such as codeword cascade and codeword interception may be performed on the two codewords of the second terminal, to obtain a combination of the two codewords which is taken as the second codeword of the three streams of SU-MIMO data, therefore, all codewords can be transmitted by one transmission.

S101 may include step A to step C.

In step A, $L_1$ weight values of the $L_1$ streams of MU-MIMO pilot and data of the first terminal and $L_2$ weight values of the $L_2$ streams of MU-MIMO pilot and data of the second terminal are combined in sequence, to obtain k weight values of the k streams of SU-MIMO pilot and data.

The weight value of the single stream of MU-MIMO pilot and data of the first terminal is:

$$W_{usr0} = \begin{bmatrix} w_{00}^{usr0} \\ w_{10}^{usr0} \\ \vdots \\ w_{(N-1)0}^{usr0} \end{bmatrix} = [w_0^{usr0}]$$

The two weight values of the two streams of MU-MIMO pilot and data of the second terminal are:

$$W_{usr1} = \begin{bmatrix} w_{00}^{usr1} & w_{01}^{usr1} \\ w_{10}^{usr1} & w_{11}^{usr1} \\ \vdots & \vdots \\ w_{(N-1)0}^{usr1} & w_{(N-1)1}^{usr1} \end{bmatrix} = [w_0^{usr1} \; w_1^{usr1}]$$

Similarly, a weight value matrix of a single terminal performing three streams of SU-MIMO pilot and data transmission with the number of layers being RI=3 is:

$$W=[w_0 \; w_1 \; w_2]$$

The apparatus for transmitting MU-MIMO pilot and data combines one weight value of the single stream of MU-MIMO pilot and data of the first terminal and two weight values of the two streams of MU-MIMO pilot and data of the second terminal in sequence, to obtain three weight values of the three streams of SU-MIMO pilot and data as follows:

$$W=[w_0^{usr0} \; w_0^{usr1} \; w_1^{usr1}]$$

It is to be noted that, the LTE R10 protocol specifies that the demodulation pilot port of the first stream of three streams of SU-MIMO must be mapped to Port7, therefore, the first weight value of the three weight values of the three streams of SU-MIMO pilot and data should correspond to Port7, that is, the first weight value should be at the first position among the three weight values.

Accordingly, the apparatus for transmitting MU-MIMO pilot and data transmits the following three streams of SU-MIMO data to the first terminal and the second terminal:

$$\begin{aligned} s_{DataTx} &= [w_0^{usr0} \; w_0^{usr1} \; w_1^{usr1}] \cdot s \\ &= [w_0^{usr0} \; w_0^{usr1} \; w_1^{usr1}] \cdot \begin{bmatrix} s_{usr0,0} \\ s_{usr1,0} \\ s_{usr1,1} \end{bmatrix} \\ &= w_0^{usr0} s_{usr0,0} + w_0^{usr1} s_{usr1,0} + w_1^{usr1} s_{usr1,1} \end{aligned}$$

In step B, any one of the p codewords of the $L_1$ streams of MU-MIMO data of the first terminal is taken as the first codeword of at least two codewords of the k streams of SU-MIMO data, and any one of the q codewords of the $L_2$ streams of MU-MIMO data of the second terminal is taken as the second codeword of the at least two codewords of the k streams of SU-MIMO data.

With reference to Table 3 again, it can be seen from Table 3 that, the LTE R10 protocol specifies that the maximum number of codewords of a single terminal is 2, and in the embodiment of the invention, the first terminal that performs the single stream of MU-MIMO pilot and data transmission occupies one codeword, and the second terminal that performs the two streams of MU-MIMO pilot and data transmission occupies two codewords, therefore, there are totally three codewords; the SU-MIMO with RI=3 is employed for transmission and three codewords are required to be mapped to two codewords.

The apparatus for transmitting MU-MIMO pilot and data takes one codeword of the single stream of MU-MIMO data of the first terminal as the first codeword of the three streams of SU-MIMO data, and takes any one of two codewords of the two streams of MU-MIMO data of the second terminal as the second codeword of the three streams of SU-MIMO data.

In this case, the other codeword of the second terminal that is not used may be processed in a next sub-frame in a similar way. Alternatively, the mapping of the other codeword of the second terminal may be completed in a retransmission way of the other codeword of a single terminal.

It is to be noted that, in a case that the number of streams of the MU-MIMO pilot and data of one of the two terminals is less, any one of codewords of the terminal with the less number of streams of MU-MIMO pilot and data may be taken as the first codeword of the k streams of SU-MIMO pilot and data.

Operations such as codeword cascade and codeword interception may be performed on the two codewords of the two streams of MU-MIMO data of the second terminal, to obtain a combination of the two codewords as the second codeword of at least two codewords of the k streams of SU-MIMO data.

In step C, the first codeword is mapped to the $L_1$ streams of MU-MIMO data of the first terminal, and the second codeword is mapped to the $L_2$ streams of MU-MIMO data of the second terminal.

Specifically, the first codeword of the three streams of SU-MIMO pilot and data is mapped to the single stream of MU-MIMO data of the first terminal, and the second codeword of the three streams of SU-MIMO pilot and data is mapped to the two streams of MU-MIMO data of the second terminal.

In this case, there is still one codeword for the second terminal that is not mapped, and the one codeword that is not mapped is processed in a next sub-frame in a similar way. Alternatively, the mapping of the codeword that is not mapped may be completed in a retransmission way of the codeword of a single terminal.

Step B to step C are performed repeatedly until the mapping between the $L_1$ streams of MU-MIMO data of the first terminal and the corresponding p codewords and the mapping between the $L_2$ streams of MU-MIMO data of the second terminal and the corresponding q codewords are completed, i.e., until the p codewords of the first terminal and the q codewords of the second terminals are all mapped.

In S102, parameters of demodulation pilot ports of the two terminals are modified in a configuration way of the k streams of SU-MIMO pilot.

The parameters of the demodulation pilot ports include the number of layers RI, the number of the demodulation pilot ports and a SCID value.

S102 includes step one to step three as follows.

In step one, the number of layers RI of the first terminal is modified to be RI=k and the first terminal is notified of the modification, the number of layers RI is the number of layers or streams of spatial multiplexing when the first terminal performs data transmission.

The number of layers RI corresponds to the number of streams of the MU-MIMO pilot and data transmission performed by the first terminal. In a case that the first terminal performs one stream of MU-MIMO pilot and data transmission, the number of layers RI thereof equals to 1. In a case that the apparatus for transmitting MU-MIMO pilot and data is to transmit three streams of SU-MIMO pilot and data to the first terminal, the apparatus for transmitting MU-MIMO pilot and data modifies the number of layers RI of the first terminal to be RI=3, and inform the first terminal of RI=3 through DCI.

In step two, $L_2$ demodulation pilot ports are additionally set for the first terminal, which correspond to the $L_2$ streams of MU-MIMO pilot of the second terminal.

In this case, the number of streams of the pilot and data transmission of the first terminal is increased from one to three, therefore, three corresponding demodulation pilot ports are required. Compared with the configuration of one stream of MU-MIMO pilot and data, the apparatus for transmitting MU-MIMO pilot and data additionally sets two demodulation pilot ports for the first terminal, that is, the demodulation pilot ports of the first terminal are Port7, Port8 and Port9, where Port7 and Port8 are on a same time and frequency resource.

In step three, all SCID values of the demodulation pilot ports on the same time and frequency resource are configured to be 0 or all SCID values of the demodulation pilot ports on the same time and frequency resource are configured to be 1.

Specifically, the apparatus for transmitting MU-MIMO pilot and data configures all of the SCID values of the demodulation pilot ports Port7 and Port8 on the same time and frequency resource to be 0 or to be 1.

Preferably, the first codeword of the three streams of SU-MIMO data is mapped to the single stream of MU-MIMO data of the first terminal, that is, the first codeword of the three streams of SU-MIMO data corresponds to the demodulation pilot port Port7 of the first terminal, the first terminal can demodulate only one stream of data corresponding to the first codeword of the three streams of SU-MIMO data, therefore, the apparatus for transmitting MU-MIMO pilot and data configures the demodulation pilot port for the first stream of the first terminal to be Port7& (SCID=0 or 1), but does not configure the demodulation pilot ports for the second stream and the third stream of the first terminal, which are reserved for the second terminal for pilot transmission.

In the embodiment of the invention, the first terminal only uses Port7, and the second terminal uses Port8 and Port9, with Port7 and Port8 being on a same time and frequency resource, therefore, the configuring unit 203 configures the SCID value of the demodulation pilot port Port8 of the second terminal to be the same as the SCID value of the demodulation pilot port Port7 of the first terminal. The configuring unit 203 may configure the SCID value of the demodulation pilot port Port9 of the second terminal to 0 or 1 arbitrarily.

Similarly, S102 further includes the following steps:

modifying the number of layers RI' of the second terminal to be RI'=k and notifying the second terminal of the modification, where the number of layers RI' is the number of layers or streams of spatial multiplexing when the second terminal performs data transmission; and additionally setting $L_1$ demodulation pilot ports for the second terminal, where the $L_1$ demodulation pilot ports correspond to the $L_1$ streams of MU-MIMO pilot of the first terminal.

In S103, the k streams of SU-MIMO pilot and data are transmitted to the two terminals in a transmission way of the k streams of SU-MIMO pilot and data.

The apparatus for transmitting MU-MIMO pilot and data transmits the following three streams of SU-MIMO data constructed by the constructing module 10 to the MU-MIMO terminals:

$$s_{DataTx} = [\, w_0^{usr0} \quad w_0^{usr1} \quad w_1^{usr1} \,] \cdot s$$

$$= [\, w_0^{usr0} \quad w_0^{usr1} \quad w_1^{usr1} \,] \cdot \begin{bmatrix} s_{usr0,0} \\ s_{usr1,0} \\ s_{usr1,1} \end{bmatrix}$$

$$= w_0^{usr0} s_{usr0,0} + w_0^{usr1} s_{usr1,0} + w_1^{usr1} s_{usr1,1}$$

The first terminal can demodulate only the first stream of pilot and data, that is, the MU-MIMO pilot and data of the first terminal, of the three streams of SU-MIMO pilot and data, but cannot demodulate the second stream of pilot and data and the third stream of pilot and data in the three streams of SU-MIMO pilot and data, and the second stream of pilot and data and the third stream of pilot and data in the three streams of SU-MIMO pilot and data are virtual and insignificant for the first terminal.

Similarly, the second terminal can demodulate only the second stream of pilot and data and the third stream of pilot and data, that is, the MU-MIMO pilot and data of the second terminal, of the three streams of SU-MIMO pilot and data, but cannot demodulate the first stream of pilot and data in the three streams of SU-MIMO pilot and data.

S103 may include step one and step two as follows.

In step one, the first codeword of at least two codewords of the k streams of SU-MIMO data is mapped to a layer of the first terminal in a transmission way of the k streams of SU-MIMO pilot and data.

Specifically, the apparatus for transmitting MU-MIMO pilot and data maps the first codeword of the three streams of SU-MIMO data to a first layer of the first terminal and maps the second codeword of the three streams of SU-MIMO data to the second layer and the third layer of the first terminal, in the transmission way of the k streams of SU-MIMO pilot and data.

In step two, the layers of the first terminal are mapped to demodulation pilot ports in the transmission way of the k streams of SU-MIMO pilot.

Specifically, the apparatus for transmitting MU-MIMO pilot and data maps the first layer of the first terminal to a demodulation pilot port Port7 of the first terminal, maps the second layer of the first terminal to a demodulation pilot port Port8 of the first terminal, and maps the third layer of the first terminal to a demodulation pilot port Port9 of the first terminal, in the transmission way of the k streams of SU-MIMO pilot.

Similarly, S103 further includes:

mapping the second codeword of the at least two codewords of the k streams of SU-MIMO data to a layer of the second terminal in the transmission way of the k streams of SU-MIMO pilot and data; and mapping the layer of the second terminal to a demodulation pilot port in the transmission way of the k streams of SU-MIMO pilot.

The condition of the second terminal is similar as that of the first terminal, and the principle that the apparatus for transmitting MU-MIMO pilot and data performs pilot and data transmission with the second terminal is the same as the principle that the apparatus for transmitting MU-MIMO pilot and data performs pilot and data transmission with the first terminal, which is not described in detail herein.

Similarly, it can be deduced that, in a case that two terminals perform four streams, five streams, six streams, seven streams or eight streams of MU-MIMO pilot and data transmission, the four streams, five streams, six streams, seven streams or eight streams of MU-MIMO pilot and data can be constructed to the corresponding number of streams of SU-MIMO pilot and data in a similar way, to make the pilots orthogonal, which is not described in detail herein.

Similarly, it can be deduced that, in a case that more than two terminals perform three streams, four streams, five streams, six streams, seven streams or eight streams of MU-MIMO pilot and data transmission, the three streams, four streams, five streams, six streams, seven streams or eight streams of MU-MIMO pilot and data can be constructed to the corresponding number of streams of SU-MIMO pilot and data in a similar way, to make the pilots orthogonal, which is not described in detail herein.

In the embodiment of the invention, k streams of SU-MIMO pilot and data are constructed by determining the total number k of streams of MU-MIMO pilot and data transmission performed by the at least two terminal on a same time and frequency resource, the parameters of demodulation pilot ports of the at least two terminals are modified, and the k streams of SU-MIMO pilot and data are transmitted to the terminals. Since the SU-MIMO pilot has good orthogonality and independency, pseudo-orthogonality of the pilots when the two terminals perform MU-MIMO pilot and data transmission can be avoided by the embodiment of the invention.

Figure 12:
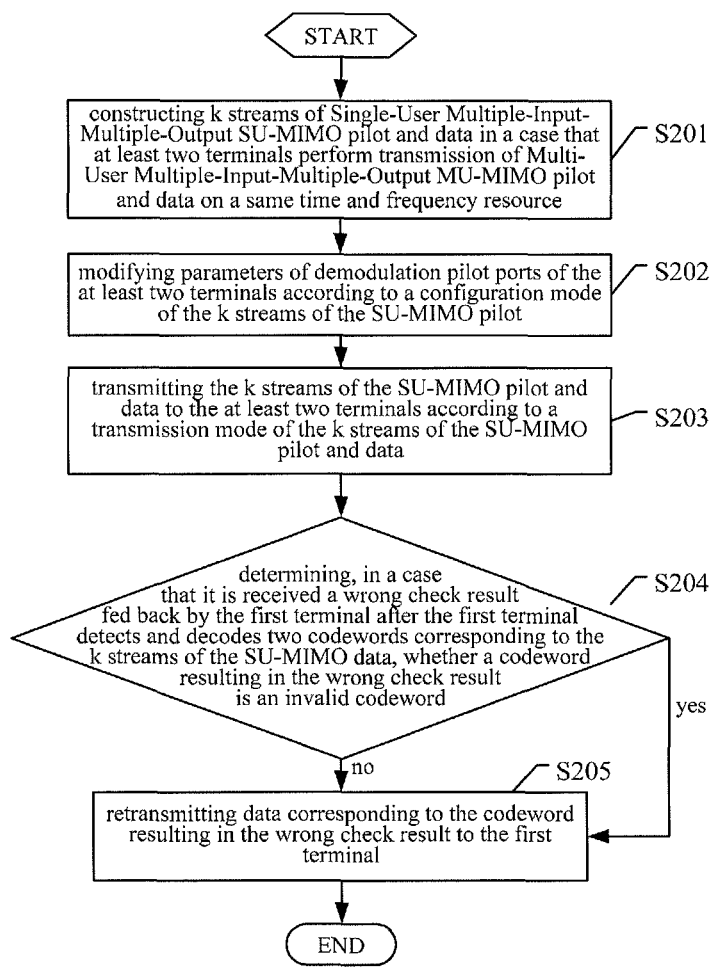
FIG. 12 is a schematic flow chart of another method for transmitting MU-MIMO pilot and data according to an embodiment of the invention.

Reference is made to FIG. 12 which is a schematic flow chart of another method for transmitting MU-MIMO pilot and data according to an embodiment of the invention. The method includes S201 to S205.

In S201, k streams of Single-user Multiple-Input-Multiple-Output SU-MIMO pilot and data are constructed when at least two terminals perform MU-MIMO pilot and data transmission on a same time and frequency resource.

The at least two terminals include a first terminal and a second terminal, the first terminal performs transmission of $L_1$ streams of MU-MIMO pilot and data, and the second terminal performs transmission of $L_2$ streams of MU-MIMO pilot and data, where $$k = \sum_i L_i,$$

and $L_i$ is the number of streams of MU-MIMO pilot and data transmission performed by an ith terminal.

The $L_1$ streams of MU-MIMO pilot and data of the first terminal correspond to $L_1$ weight values, and the $L_1$ streams of MU-MIMO data of the first terminal correspond to p codewords. The $L_2$ streams of MU-MIMO pilot and data of the second terminal correspond to $L_2$ weight values, and the $L_2$ streams of MU-MIMO data of the second terminal correspond to q codewords.

S201 further includes step A to step C.

In step A, $L_1$ weight values of the $L_1$ streams of MU-MIMO pilot and data of the first terminal and $L_2$ weight values of the $L_2$ streams of MU-MIMO pilot and data of the second terminal are combined in sequence, to obtain k weight values of the k streams of SU-MIMO pilot and data.

In step B, any one of the p codewords of the $L_1$ streams of MU-MIMO data of the first terminal is taken as the first codeword of at least two codewords of the k streams of SU-MIMO data, and any one of the q codewords of the $L_2$ streams of MU-MIMO data of the second terminal is taken as the second codeword of the at least two codewords of the k streams of SU-MIMO data.

In step C, the first codeword is mapped to the $L_1$ streams of MU-MIMO data, and the second codeword is mapped to the $L_2$ streams of MU-MIMO data.

Step B to step C are performed repeatedly until the mapping between the $L_1$ streams of MU-MIMO data of the first terminal and the corresponding p codewords and the mapping between the $L_2$ streams of MU-MIMO data of the second terminal and the corresponding q codewords are completed.

In S202, parameters of demodulation pilot ports of the two terminals are modified in a configuration way of the k streams of SU-MIMO pilot.

Step 202 further includes step one to step three as follows.

In step one, the number of layers RI of the first terminal is modified to be RI=k and the first terminal is notified of the modification, the number of layers RI is the number of layers or streams of spatial multiplexing when the first terminal performs data transmission.

In step two, $L_2$ demodulation pilot ports are additionally set for the first terminal, which correspond to the $L_2$ streams of MU-MIMO pilot of the second terminal.

Similarly, S202 further includes:

modifying the number of layers RI' of the second terminal to be RI'=k and notifying the second terminal of the modification, where the number of layers RI' is the number of layers or streams of spatial multiplexing when the second terminal performs data transmission; and additionally setting $L_1$ demodulation pilot ports for the second terminal, where the $L_1$ demodulation pilot ports correspond to the $L_1$ streams of MU-MIMO pilot of the first terminal.

In step three, all SCID values of the demodulation pilot ports on the same time and frequency resource are configured to be 0 or all SCID values of the demodulation pilot ports on the same time and frequency resource are configured to be 1.

In S203, the k streams of SU-MIMO pilot and data are transmitted to the at least two terminals in a transmission way of the k streams of SU-MIMO pilot and data.

S203 includes step one to step two as follows.

In step one, the first codeword of the at least two codewords of the k streams of SU-MIMO data is mapped to a layer of the first terminal in a transmission way of the k streams of SU-MIMO pilot and data.

In step two, the layer of the first terminal are mapped to a demodulation pilot port in the transmission way of the k streams of SU-MIMO pilot.

Similarly, S203 further includes:

mapping the second codeword of the at least two codewords of the k streams of SU-MIMO data to a layer of the second terminal in the transmission way of the k streams of SU-MIMO pilot and data; and mapping the layer of the second terminal to a demodulation pilot port in the transmission way of the k streams of SU-MIMO pilot.

In S204, it is determined, in a case that it is received a wrong check result fed back by the first terminal after the first terminal detects and decodes the codewords of the k streams of SU-MIMO data, whether a codeword resulting in the wrong check result is an invalid codeword.

After the apparatus for transmitting MU-MIMO pilot and data transmits the three streams of SU-MIMO pilot and data to the first terminal, the first terminal demodulates the three streams of SU-MIMO pilot and data in a demodulation way of three streams of SU-MIMO pilot and data. Specifically, the first terminal detects the two codewords of the three streams of SU-MIMO data, and feeds back a check result, including ACK/NACK.

In a case that the apparatus for transmitting MU-MIMO pilot and data receives a wrong (NACK) check result fed back by the first terminal after the first terminal detects the codewords of the three streams of SU-MIMO data, the apparatus for transmitting MU-MIMO pilot and data determines whether the codeword resulting in the wrong check result is an invalid codeword.

In a case that the codeword resulting in the wrong check result is an invalid codeword, i.e., the second codeword, it is determined that the second stream and the third stream of the three streams of SU-MIMO data are wrong. Since the first stream is the MU-MIMO data of the first terminal, the first terminal only concerns the first stream of the three streams of SU-MIMO data, and the wrong second stream or third stream does not affect the first terminal, so data retransmission is not needed.

In S205, the data corresponding the codeword resulting in the wrong check result is retransmitted to the first terminal.

In a case that the codeword resulting in the wrong check result is not an invalid codeword, that is, the codeword resulting in the wrong check result is the first codeword, it is determined that the first stream of the three streams of SU-MIMO data is wrong, which indicates that the MU-MIMO data of the first terminal is wrong, therefore, the apparatus for transmitting MU-MIMO pilot and data retransmits the data corresponding to the codeword resulting in the wrong check result to the first terminal.

It is noted that if the transmission performed by the first terminal is a nontransparent MU-MIMO pilot and data transmission, that is, the apparatus for transmitting MU-MIMO pilot and data does not know which codeword of the first terminal is an invalid codeword, the first terminal may determine a valid codeword and an invalid codeword by detecting energy of pilot positions corresponding to the two codewords of the three streams of SU-MIMO data. Therefore, the first terminal may not detect and decode the invalid codeword, but directly feedback CRC=0 or 1 for the invalid codeword CW. In this way, calculation complexity is reduced, and the apparatus for transmitting MU-MIMO pilot and data does not perform any subsequent processing on the invalid codeword. The process has been described in the embodiment of the apparatus for transmitting MU-MIMO pilot and data, which is not described in detail herein.

The condition of the second terminal is similar as that of the first terminal, and the principle that the apparatus for transmitting MU-MIMO pilot and data performs pilot and data transmission with the second terminal is the same as the principle that the apparatus for transmitting MU-MIMO pilot and data performs pilot and data transmission with the first terminal, which is not described in detail herein.

Similarly, it can be deduced that, in a case that two terminals perform four streams, five streams, six streams, seven streams or eight streams of MU-MIMO pilot and data transmission, the four streams, five streams, six streams, seven streams or eight streams of MU-MIMO pilot and data can be constructed to the corresponding number of streams of SU-MIMO pilot and data in a similar way, to make the pilots orthogonal, which is not described in detail herein.

Similarly, it can be deduced that, in a case that more than two terminals perform three streams, four streams, five streams, six streams, seven streams or eight streams of MU-MIMO pilot and data transmission, the three streams, four streams, five streams, six streams, seven streams or eight streams of MU-MIMO pilot and data can be constructed to the corresponding number of streams of SU-MIMO pilot and data in a similar way, to make the pilots orthogonal, which is not described in detail herein.

In the embodiment of the invention, k streams of SU-MIMO pilot and data are constructed by determining the total number k of streams of MU-MIMO pilot and data transmission performed by the two terminal on a same time and frequency resource, the parameters of demodulation pilot ports of the at least two terminals are modified, and the k streams of SU-MIMO pilot and data are transmitted to the terminals. Since the SU-MIMO pilot has good orthogonality and independency, pseudo-orthogonality of the pilots when the two terminals perform MU-MIMO pilot and data transmission can be avoided by the embodiment of the invention.

Figure 13:
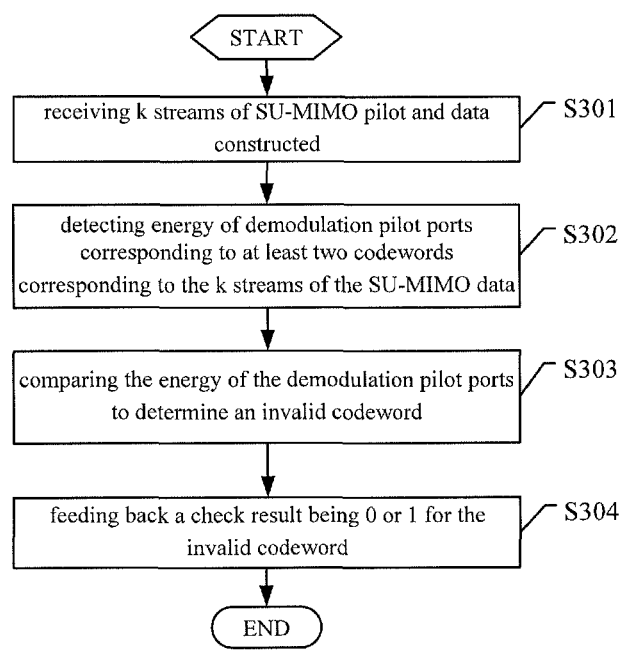
FIG. 13 is a schematic flow chart of a method for receiving MU-MIMO pilot and data according to an embodiment of the invention.

Reference is made to FIG. 13 which is a schematic flow chart of a method for receiving MU-MIMO pilot and data according to an embodiment of the invention. The method includes S301 to S304.

In S301, constructed k streams of SU-MIMO pilot and data are received.

The k streams of SU-MIMO pilot and data are constructed based on $L_i$ streams of MU-MIMO pilot and data of at least two terminals receiving MU-MIMO pilot and data, where $$k = \sum_i L_i,$$

and $L_i$ is the number of streams of MU-MIMO pilot and data transmission performed by an ith terminal. The MU-MIMO pilot and data transmission is nontransparent.

In the embodiment of the invention, there are, for example two terminals for receiving MU-MIMO pilot and data which perform nontransparent MU-MIMO pilot and data transmission with the apparatus for transmitting MU-MIMO pilot and data, that is, a terminal A for receiving MU-MIMO pilot and data and a terminal B for receiving MU-MIMO pilot and data. Specifically, the terminal A for receiving MU-MIMO pilot and data performs nontransparent transmission of $L_3$ streams of MU-MIMO pilot and data, where $L_3=1$, and the terminal B for receiving MU-MIMO pilot and data performs nontransparent transmission of $L_4$ streams of MU-MIMO pilot and data, where $L_4=2$. The k streams of SU-MIMO pilot and data are constructed based on the $L_3$ streams of MU-MIMO pilot and data of the terminal A for receiving MU-MIMO pilot and data and the $L_4$ streams of MU-MIMO pilot and data of the terminal B for receiving MU-MIMO pilot and data, where $$k = \sum_i L_i = 3.$$

The processes of constructing and transmitting the k streams of SU-MIMO pilot and data have been illustrated in detail in the above embodiment of the apparatus for transmitting MU-MIMO pilot and data, which is not described in detail herein. In a case that the apparatus for transmitting MU-MIMO pilot and data transmits the constructed three streams of SU-MIMO pilot and data to the terminal A for receiving MU-MIMO pilot and data, the terminal A for receiving MU-MIMO pilot and data receives the constructed three streams of SU-MIMO pilot and data.

In S302, energy of demodulation pilot ports corresponding to at least two codewords of the k streams of SU-MIMO data is detected.

Since the MU-MIMO pilot and data transmission performed by the terminal A for receiving MU-MIMO pilot and data is nontransparent, that is, the apparatus for transmitting MU-MIMO pilot and data does not know which codeword of the terminal A for receiving MU-MIMO pilot and data is an invalid codeword, the detecting module 012 may determine a valid codeword and an invalid codeword by detecting energy of positions of pilots corresponding to the two codewords of the three streams of SU-MIMO data. Therefore, the terminal A for receiving MU-MIMO pilot and data may not detect and decode the invalid codeword, but directly feedback CRC=0 or 1 for the invalid codeword CW. In this way, calculation complexity is reduced, and the apparatus for transmitting MU-MIMO pilot and data does not perform any processing for the feedback result of the invalid codeword.

Reference is made to FIG. 9 again which is a schematic diagram of demodulation pilot position patterns in the LTE R10 protocol. The Walsh code for distinguishing is as follows:

$$r_0 = H_0 w_{00} s_0^{scid0} + q \cdot H_0 w_{01} s_0^{scid0} + I_{00} + n_{00}$$

$$r_1 = H_0 w_{00} s_1^{scid0} + \bar{q} \cdot H_0 w_{01} s_1^{scid0} + I_{01}{}^\circ n_{01}$$

where $r_0$ and $r_1$ are signals received by a demodulation pilot port port7, q represents a Walsh code element corresponding to the demodulation pilot port port7, q=−1 or 1, q=1→$\bar{q}$=−1, scid0 represents a Scrambling identity of a demodulation pilot port, scid0 is SCID=0, $I_{00}$ represents interference, $n_{00}$ represents noise, $w_{00}$ represents a weight value of the first layer, and $H_0$ represents a frequency domain channel response from the base station to the terminal.

A equivalent channel of a stream corresponding to the demodulation pilot port port7 may be obtained by using signals $r_0$ and $r_1$ received by the demodulation pilot port port7:

$$\begin{aligned}
H_{port7,LS} &= \hat{H}_0 \hat{w}_{00} \\
&= \frac{r_0 \cdot (s_0^{scid0})^* + r_1 \cdot (s_1^{scid0})^*}{2} \\
&= \frac{H_0 w_{00} + I_{00}(s_0^{scid0})^* + n_{00}(s_0^{scid0})^* +}{2} \\
&\quad \frac{H_0 w_{00} + I_{01}(s_1^{scid0})^* + n_{01}(s_1^{scid0})^*}{2} \\
&= H_0 w_{00} + \frac{I_{00}(s_0^{scid0})^* + n_{00}(s_0^{scid0})^* + I_{01}(s_1^{scid0})^* + n_{01}(s_1^{scid0})^*}{2}
\end{aligned}$$

where $H_{port7,\ LS}$ is a frequency domain equivalent channel response corresponding to the pilot port port7. Similarly, $H_{port8,\ LS}$ may be obtained by a difference between $r_1$ and $r_0$.

Similarly, the equivalent channel $H_{port9,\ LS}$ of a stream corresponding to a pilot port port9 may be obtained based on $r_2$ and $r_3$.

In S303, the energy of the demodulation pilot ports is compared to determine an invalid codeword.

Specifically, the terminal A for receiving MU-MIMO pilot and data compares the energy of the demodulation pilot ports, to determine an invalid codeword.

$|H_{port7,\ LS}|^2 > |H_{port9,\ LS}|^2$ indicates that the terminal A for receiving MU-MIMO pilot and data uses Port7/8, and the valid codeword is the first codeword, therefore the invalid codeword is the second codeword.

In S304, a check result being 0 or 1 for the invalid codeword is fed back.

On the basis that the terminal A for receiving MU-MIMO pilot and data uses Port7/8, the valid codeword is the first codeword and the invalid codeword is the second codeword, the terminal A for receiving MU-MIMO pilot and data may directly feedback CRC=0 or 1 for the second codeword.

Therefore, for a nontransparent MU-MIMO transmission, that is, the apparatus for transmitting MU-MIMO pilot and data does not know which codeword of the terminal A for receiving MU-MIMO pilot and data is an invalid codeword, the terminal A for receiving MU-MIMO pilot and data may determine a valid codeword and an invalid codeword by detecting energy of pilot positions corresponding to two codewords of the three streams of SU-MIMO data, therefore, the first terminal may not detect and decode the invalid codeword, but directly feedback CRC=0 or 1 for the invalid codeword CW. In this way, calculation complexity is reduced, and the apparatus for transmitting MU-MIMO pilot and data does not perform any subsequent processing on the invalid codeword.

From the description of the embodiments above, it can be known clearly by those skilled in the art that the invention may be implemented by software and necessary hardware platforms, or may be implemented by hardware only. Based on this understanding, part or all of the technical solution of the invention that contributes to the conventional technology may be embodied by a software product, and the computer software product may be stored in a memory medium such as ROM/RAM, a magnetic disk and an optical disc, including multiple instructions which make a computer apparatus (may be a personal computer, a server, a network apparatus or the like) perform the method described in various embodiments of the invention or a certain part of embodiments.

The foregoing are only preferred embodiments of the invention and are not intent to limit the scope of claims of the invention. Those skilled in the art can understand all or part of flows for implementing the embodiments described above, and equivalent changes made to the claims of the invention also fall in the scope of the invention.

What is claimed is:

1. A method for transmitting Multi-User Multiple-Input-Multiple-Output (MU-MIMO) pilot and data, comprising:

constructing, by a construction module of an apparatus for transmitting the MU-MIMO pilot and data, k streams of Single-User Multiple-Input-Multiple-Output (SU-MIMO) pilot and data when at least two terminals perform transmission of the MU-MIMO pilot and data on a same time and frequency resource;

modifying, by a modifying module of the apparatus, parameters of demodulation pilot ports of the at least two terminals according to the k streams of the SU-MIMO pilot; and transmitting, by a transmitting module of the apparatus, the k streams of the SU-MIMO pilot and data to the at least two terminals, wherein the at least two terminals comprise a first terminal and a second terminal, the first terminal performs transmission of $L_1$ streams of the MU-MIMO pilot and data and the second terminal performs transmission of $L_2$ streams of the MU-MIMO pilot and data, wherein $$k = \sum_i L_i,$$

and $L_i$ is a quantity of streams of the MU-MIMO pilot and data transmission performed by an ith terminal.

2. The method according to claim 1, wherein the $L_1$ streams of the MU-MIMO pilot and data of the first terminal correspond to $L_1$ weight values, and the $L_1$ streams of the MU-MIMO data of the first terminal correspond to p codewords; the $L_2$ streams of the MU-MIMO pilot and data of the second terminal correspond to $L_2$ weight values, and the $L_2$ streams of the MU-MIMO data of the second terminal correspond to q codewords, wherein the $L_1$ weight values and the $L_2$ weight values are configured to be synthesized into a weight value matrix of SU-MIMO, and the p codewords and the q codewords are configured to be synthesized into the SU-MIMO data;

wherein constructing the k streams of the SU-MIMO pilot and data further comprises:

combining, by a weight value synthesizing unit of the constructing module, the $L_1$ weight values corresponding to the $L_1$ streams of the MU-MIMO pilot and data of the first terminal and the $L_2$ weight values corresponding to the $L_2$ streams of the MU-MIMO pilot and data of the second terminal in sequence, to obtain k weight values corresponding to the k streams of the SU-MIMO pilot and data;

taking, by a codeword synthesizing unit of the constructing module, any one of the p codewords corresponding to the $L_1$ streams of the MU-MIMO data of the first terminal as a first codeword of at least two codewords corresponding to the k streams of the SU-MIMO data, and taking any one of the q codewords corresponding to the $L_2$ streams of the MU-MIMO data of the second terminal as a second codeword of the at least two codewords corresponding to the k streams of the SU-MIMO data; and mapping, by a data mapping unit of the constructing module, the first codeword to the $L_1$ streams of the MU-MIMO data, and mapping the second codeword to the $L_2$ streams of the MU-MIMO data.

3. The method according to claim 2, wherein transmitting the k streams of the SU-MIMO pilot and data to the at least two terminals further comprises:

mapping, by a first mapping unit of the transmitting module, a first codeword of at least two codewords corresponding to the k streams of the SU-MIMO data to a layer of the first terminal; and mapping, by a second mapping unit of the transmitting module, the layer of the first terminal to the demodulation pilot port.

4. The method according to claim 2, wherein transmitting the k streams of the SU-MIMO pilot and data to the at least two terminals further comprises:

mapping, by a first mapping unit of the transmitting module, a second codeword of at least two codewords corresponding to the k streams of the SU-MIMO data to a layer of the second terminal; and mapping, by a second mapping unit of the transmitting module, the layer of the second terminal to the demodulation pilot port.

5. The method according to claim 2, wherein after transmitting the k streams of the SU-MIMO pilot and data to the at least two terminals, the method further comprises:

determining, by a determining module of the apparatus, when it is received a wrong check result fed back by the first terminal after the first terminal detects and decodes the codewords corresponding to the k streams of the SU-MIMO data, whether a codeword resulting in the wrong check result is an invalid codeword; and when the codeword resulting in the wrong check result is an invalid codeword, performing, by the transmitting module no retransmission; otherwise, retransmitting, by the transmitting module, data corresponding to the codeword resulting in the wrong check result to the first terminal.

6. The method according to claim 2, wherein after transmitting the k streams of the SU-MIMO pilot and data to the at least two terminals, the method further comprises:

determining, by a determining module of the apparatus, when it is received a wrong check result fed back by the second terminal after the second terminal detects and decodes the codewords corresponding to the k streams of the SU-MIMO data, whether a codeword resulting in the wrong check result is an invalid codeword; and when the codeword resulting in the wrong check result is an invalid codeword, performing, by the transmitting module no retransmission; otherwise, retransmitting, by the transmitting module, data corresponding to the codeword resulting in the wrong check result to the second terminal.

7. The method according to claim 1, wherein the $L_1$ streams of the MU-MIMO pilot and data of the first terminal correspond to $L_1$ weight values, and the $L_1$ streams of the MU-MIMO data of the first terminal correspond to p codewords; the $L_2$ streams of the MU-MIMO pilot and data of the second terminal correspond to $L_2$ weight values, and the $L_2$ streams of the MU-MIMO data of the second terminal correspond to q codewords, wherein the $L_1$ weight values and the $L_2$ weight values are configured to be synthesized into a weight value matrix of SU-MIMO, and the p codewords and the q codewords are configured to be synthesized into the SU-MIMO data;

wherein constructing the k streams of the SU-MIMO pilot and data further comprises:

combining, by a weight value synthesizing unit of the constructing module, the $L_1$ weight values corresponding to the $L_1$ streams of the MU-MIMO pilot and data of the first terminal and the $L_2$ weight values corresponding to the $L_2$ streams of the MU-MIMO pilot and data of the second terminal in sequence, to obtain k weight values corresponding to the k streams of the SU-MIMO pilot and data;

taking, by a codeword synthesizing unit of the constructing module, a combination of the p codewords corresponding to the $L_1$ streams of the MU-MIMO data of the first terminal as a first codeword of at least two codewords corresponding to the k streams of the SU-MIMO data, and taking a combination of the q codewords corresponding to the $L_2$ streams of the MU-MIMO data of the second terminal as a second codeword of the at least two codewords corresponding to the k streams of the SU-MIMO data; and mapping, by a data mapping unit of the constructing module, the first codeword to the $L_1$ streams of the MU-MIMO data, and mapping the second codeword to the $L_2$ streams of the MU-MIMO data.

8. The method according to claim 1, wherein modifying the parameters of the demodulation pilot ports of the at least two terminals further comprises:

modifying, by a modifying unit of the modifying module, a quantity of layers RI of the first terminal to be RI=k and notifying the first terminal of the modification, wherein the quantity of layers RI is the quantity of layers or streams of spatial multiplexing when the first terminal performs data transmission;

additionally setting, by a setting unit of the modifying module, $L_2$ virtual demodulation pilot ports for the first terminal, wherein the $L_2$ virtual demodulation pilot ports correspond to the $L_2$ streams of the MU-MIMO pilot of the second terminal; and configuring, by a configuring unit of the modifying module, Scrambling identity (SCID) values of the demodulation pilot ports on the same time and frequency resource to be 0 or configuring the SCID values of the demodulation pilot ports on the same time and frequency resource to be 1.

9. The method according to claim 1, wherein modifying the parameters of the demodulation pilot ports further comprises:

modifying, by the modifying unit, the quantity of layers RI' of the second terminal to be RI'=k and notifying the second terminal of the modification, wherein the quantity of layers RI' is the quantity of layers or streams of spatial multiplexing when the second terminal performs data transmission;

additionally setting, by the setting unit, $L_1$ virtual demodulation pilot ports for the second terminal, wherein the $L_1$ virtual demodulation pilot ports correspond to the $L_1$ streams of the MU-MIMO pilot and data of the first terminal; and configuring, by the configuring unit, Scrambling identity (SCID) values of the demodulation pilot ports on the same time and frequency resource to be 0 or configuring the SCID values of the demodulation pilot ports on the same time and frequency resource to be 1.

10. A method for receiving Multi-User Multiple-Input-Multiple-Output (MU-MIMO) pilot and data, comprising:

receiving, by a receiving module of a terminal, k streams of Single-User Multiple-Input-Multiple-Output (SU-MIMO) pilot and data constructed;

detecting, by a detecting module of the terminal, energy of demodulation pilot ports corresponding to at least two codewords corresponding to the k streams of the SU-MIMO data;

comparing, by a comparing module of the terminal, the energy of the demodulation pilot ports, to determine an invalid codeword; and feeding back, by a feedback module of the terminal, a check result being 0 or 1 for the invalid codeword;

wherein the k streams of the SU-MIMO pilot and data are constructed based on $L_i$ streams of MU-MIMO pilot and data of at least two terminals for receiving the MU-MIMO pilot and data, $$k = \sum_i L_i,$$

and $L_i$ is a quantity of streams of the MU-MIMO pilot and data transmission performed by an ith terminal; the MU-MIMO pilot and data transmission is nontransparent.

11. An apparatus for transmitting Multi-User Multiple-Input-Multiple-Output (MU-MIMO) pilot and data, comprising:

one or more processors; and a memory storing program instructions which, when executed by the one or more processors, configure the apparatus to:

construct k streams of Single-User Multiple-Input-Multiple-Output (SU-MIMO) pilot and data when at least two terminals perform transmission of the MU-MIMO pilot and data on a same time and frequency resource;

modify parameters of demodulation pilot ports of the at least two terminals according to the k streams of the SU-MIMO pilot; and transmit the k streams of the SU-MIMO pilot and data to the at least two terminals, wherein the at least two terminals comprise a first terminal and a second terminal, the first terminal performs transmission of $L_1$ streams of the MU-MIMO pilot and data and the second terminal performs transmission of $L_2$ streams of the MU-MIMO pilot and data, wherein $$k = \sum_i L_i,$$

and $L_i$ is a quantity of streams of the MU-MIMO pilot and data transmission performed by an ith terminal.

12. The apparatus according to claim 11, wherein the $L_1$ streams of the MU-MIMO pilot and data of the first terminal correspond to $L_1$ weight values, and the $L_1$ streams of the MU-MIMO data of the first terminal correspond to p codewords; the $L_2$ streams of the MU-MIMO pilot and data of the second terminal correspond to $L_2$ weight values, and the $L_2$ streams of the MU-MIMO data of the second terminal correspond to q codewords;

wherein the $L_1$ weight values and the $L_2$ weight values are configured to be synthesized into a weight value matrix of SU-MIMO, and the p codewords and the q codewords are configured to be synthesized into the SU-MIMO data;

wherein constructing the k streams of the SU-MIMO pilot and data comprises:

combine the $L_1$ weight values corresponding to the $L_1$ streams of the MU-MIMO pilot and data of the first terminal and the $L_2$ weight values corresponding to the $L_2$ streams of the MU-MIMO pilot and data of the second terminal in sequence, to obtain k weight values corresponding to the k streams of the SU-MIMO pilot and data;

take any one of the p codewords corresponding to the $L_1$ streams of the MU-MIMO data of the first terminal as a first codeword of at least two codewords corresponding to the k streams of the SU-MIMO data, and take any one of the q codewords corresponding to the $L_2$ streams of the MU-MIMO data of the second terminal as a second codeword of the at least two codewords corresponding to the k streams of the SU-MIMO data; and map the first codeword to the $L_1$ streams of the MU-MIMO data, and map the second codeword to the $L_2$ streams of the MU-MIMO data.

13. The apparatus according to claim 12, wherein transmitting the k streams of the SU-MIMO pilot and data to the at least two terminals comprises:

map a first codeword of at least two codewords corresponding to the k streams of the SU-MIMO data to a layer of the first terminal; and map the layer of the first terminal to the demodulation pilot port.

14. The apparatus according to claim 12, wherein transmitting the k streams of the SU-MIMO pilot and data to the at least two terminals comprises:

map a second codeword of at least two codewords corresponding to the k streams of the SU-MIMO data to a layer of the second terminal; and map the layer of the second terminal to the demodulation pilot port.

15. The apparatus according to claim 12 wherein the apparatus is further configured to:

determine, when it is received a wrong check result fed back by the first terminal after the first terminal detects and decodes the codewords corresponding to the k streams of the SU-MIMO data, whether a codeword resulting in the wrong check result is an invalid codeword; and perform no retransmission when the codeword resulting in the wrong check result is an invalid codeword; and otherwise, retransmit data corresponding to the codeword resulting in the wrong check result to the first terminal.

16. The apparatus according to claim 11, wherein constructing the k streams of the SU-MIMO pilot and data comprises:

take a combination of the p codewords corresponding to the $L_1$ streams of the MU-MIMO data of the first terminal as a first codeword of at least two codewords corresponding to the k streams of the SU-MIMO data, and take a combination of the q codewords corresponding to the $L_2$ streams of the MU-MIMO data of the second terminal as a second codeword of the at least two codewords corresponding to the k streams of the SU-MIMO data.

17. The apparatus according to claim 11, wherein modifying the parameters of the demodulation pilot ports of the at least two terminals comprises:

modify a quantity of layers RI of the first terminal to be RI=k and notifying the first terminal of the modification, wherein the quantity of layers RI is the quantity of layers or streams of spatial multiplexing when the first terminal performs data transmission;

additionally set $L_2$ virtual demodulation pilot ports for the first terminal, wherein the $L_2$ virtual demodulation pilot ports correspond to the $L_2$ streams of the MU-MIMO pilot of the second terminal; and configure Scrambling identity (SCID) values of the demodulation pilot ports on the same time and frequency resource to be 0 or configure the SCID values of the demodulation pilot ports on the same time and frequency resource to be 1.

18. The apparatus according to claim 11, wherein modifying the parameters of the demodulation pilot ports of the at least two terminals comprises:

modify the quantity of layers RI' of the second terminal to be RI'=k and notifying the second terminal of the modification, wherein the quantity of layers RI' is the quantity of layers or streams of spatial multiplexing when the second terminal performs data transmission; and additionally set $L_1$ virtual demodulation pilot ports for the second terminal, wherein the $L_1$ virtual demodulation pilot ports correspond to the $L_1$ streams of the MU-MIMO pilot of the first terminal.

19. A terminal for receiving Multi-User Multiple-Input-Multiple-Output (MU-MIMO) pilot and data, comprising:

one or more processors; and a memory storing program instructions which, when executed by the one or more processors, configured the terminal to:

receive k streams of Single-User Multiple-Input-Multiple-Output (SU-MIMO) pilot and data constructed;

energy of demodulation pilot ports corresponding to at least two codewords corresponding to the k streams of the SU-MIMO data;

compare the energy of the demodulation pilot ports to determine an invalid codeword; and feed back a check result being 0 or 1 for the invalid codeword;

wherein the k streams of the SU-MIMO pilot and data are constructed based on $L_i$ streams of MU-MIMO pilot and data of at least two terminals for receiving the MU-MIMO pilot and data, $$k = \sum_i L_i,$$

and $L_i$ is a quantity of streams of the MU-MIMO pilot and data transmission performed by an ith terminal; the MU-MIMO pilot and data transmission is nontransparent.

20. A system for Multi-User Multiple-Input-Multiple-Output (MU-MIMO) pilot and data transmission, wherein the system for MU-MIMO pilot and data transmission comprises an apparatus for transmitting MU-MIMO pilot and data and at least two terminals for receiving the MU-MIMO pilot and data which perform pilot and data transmission with the apparatus for transmitting the MU-MIMO pilot and data, wherein the apparatus for transmitting MU-MIMO pilot and data comprises:

one or more processors; and a memory storing program instructions which, when executed by the one or more processors, configure the apparatus to:

construct k streams of Single-User Multiple-Input-Multiple-Output (SU-MIMO) pilot and data in a case that at least two terminals perform transmission of the MU-MIMO pilot and data on a same time and frequency resource;

modify parameters of demodulation pilot ports of the at least two terminals according to the k streams of the SU-MIMO pilot; and transmit the k streams of the SU-MIMO pilot and data to the at least two terminals, wherein the at least two terminals comprise a first terminal and a second terminal, the first terminal performs transmission of $L_1$ streams of the MU-MIMO pilot and data and the second terminal performs transmission of $L_2$ streams of the MU-MIMO pilot and data, wherein the k streams of the SU-MIMO pilot and data are constructed based on $L_i$ streams of MU-MIMO pilot and data of at least two terminals for receiving MU-MIMO pilot and data, $$k = \sum_i L_i,$$

and $L_i$ is a quantity of streams of the MU-MIMO pilot and data transmission performed by an ith terminal, the MU-MIMO pilot and data transmission is nontransparent; and wherein each of the at least two terminals for receiving the MU-MIMO pilot and data comprises:

one or more processors; and a memory storing program instructions which, when executed by the one or more processors, configure the terminal to:

receive the k streams of SU-MIMO pilot and data constructed;

detect energy of demodulation pilot ports corresponding to at least two codewords corresponding to the k streams of the SU-MIMO data;

compare the energy of the demodulation pilot ports to determine an invalid codeword; and feed back a check result being 0 or 1 for the invalid codeword.

* * * * *